United States Patent
Shibayama et al.

(10) Patent No.: US 8,995,988 B2
(45) Date of Patent: Mar. 31, 2015

(54) COMMUNICATION CHARACTERISTIC ANALYZING SYSTEM, COMMUNICATION CHARACTERISTIC ANALYZING METHOD, AND COMMUNICATION CHARACTERISTIC ANALYZING PROGRAM

(75) Inventors: Kazuhisa Shibayama, Tokyo (JP); Hirofusa Watamori, Tokyo (JP); Hirokazu Miyazaki, Tokyo (JP)

(73) Assignee: Softbank BB Corp., Tokyo (JP)

( * ) Notice: Subject to any disclaimer, the term of this patent is extended or adjusted under 35 U.S.C. 154(b) by 89 days.

(21) Appl. No.: 13/811,368

(22) PCT Filed: Jul. 21, 2010

(86) PCT No.: PCT/JP2010/004657
§ 371 (c)(1),
(2), (4) Date: Jan. 21, 2013

(87) PCT Pub. No.: WO2012/011147
PCT Pub. Date: Jan. 26, 2012

(65) Prior Publication Data
US 2013/0115961 A1 May 9, 2013

(51) Int. Cl.
*H04W 24/00* (2009.01)
*H04W 40/00* (2009.01)
(Continued)

(52) U.S. Cl.
CPC .............. *H04W 16/18* (2013.01); *H04W 16/22* (2013.01)
USPC ............................ 455/423; 455/446; 370/328

(58) Field of Classification Search
USPC .......... 455/445–449, 423–425; 702/127, 179; 370/252, 328, 254, 310
See application file for complete search history.

(56) References Cited

U.S. PATENT DOCUMENTS 7,945,435 B2   5/2011 Sugahara
2003/0023412 A1*  1/2003 Rappaport et al. ................ 703/1
(Continued)

FOREIGN PATENT DOCUMENTS

JP   2002-016556 A   1/2002
JP   2004-304302 A   10/2004
(Continued)

OTHER PUBLICATIONS

International Search Report in International Application No. PCT/JP2010/004657, filed Jul. 21, 2010.
(Continued)

*Primary Examiner* — Daniel Lai
(74) *Attorney, Agent, or Firm* — Saliwanchik, Lloyd & Eisenschenk

(57) ABSTRACT

[Object] To improve analysis precision of communication characteristic, while minimizing the calculation amount, to determine a local dead area, thereby providing useful information for cell site design.
[Solving Means] There are included the steps of: determining, on the basis of the maximum population of an area to be analyzed, an area attribute of big city, local city or rural area (S2); accepting the designation of a target building out of buildings in the area to be analyzed; finding that one or those ones of analyzing methods including quota analysis, topology analysis and geographic feature analysis which are associated with the determined area attribute, and executing a local analysis of the communication characteristic of the target building (S3-S5); and correcting, on the basis of the analysis result, the referential estimated value (A-value) of the area to be analyzed, and outputting the corrected value as a communication characteristic value of the target building (S6). A required cell site solution is output in accordance with the corrected communication characteristic value.

18 Claims, 20 Drawing Sheets

(51) Int. Cl.
*H04W 16/18* (2009.01)
*H04W 16/22* (2009.01)

(56) References Cited

U.S. PATENT DOCUMENTS

| | | | |
|---|---|---|---|
| 2003/0050048 A1* | 3/2003 | Abed et al. | 455/414 |
| 2004/0127224 A1* | 7/2004 | Furukawa et al. | 455/446 |
| 2007/0088709 A1* | 4/2007 | Bailey et al. | 707/10 |
| 2007/0093212 A1* | 4/2007 | Sugahara | 455/67.16 |
| 2009/0280799 A1* | 11/2009 | Hattori | 455/424 |
| 2010/0056163 A1* | 3/2010 | Schmidt et al. | 455/446 |
| 2010/0076730 A1* | 3/2010 | Yonezawa et al. | 703/1 |
| 2011/0244901 A1 | 10/2011 | Sugahara | |

FOREIGN PATENT DOCUMENTS

| | | |
|---|---|---|
| JP | 2004-336355 A | 11/2004 |
| JP | 2005-072667 A | 3/2005 |
| JP | 2006-352551 A | 12/2006 |
| JP | 2010-187140 A | 8/2010 |
| WO | WO-2006/115068 A1 | 11/2006 |
| WO | WO-2010/067560 A1 | 6/2010 |

OTHER PUBLICATIONS

Ohmatsuzawa, K. et al. "Computer Aided Practical Cell Design System" *NTT DoCoMo Technical Journal*, Apr. 1996, 4(1):28-31.
http:/www.kke.co.jp/news/2008/pdf/NewsRelease_wireless.pdf.
Office Action dated Feb. 5, 2013 in Japanese Application No. 2009-029163, filed Feb. 10, 2009.

* cited by examiner

FIG.5
(a) Over-building (locally and heavily built-up)
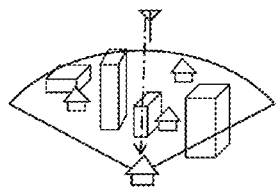
(b) Over-building (locally behind building)
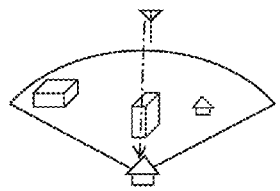
(c) Open
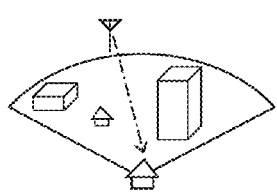
(d) Roadside
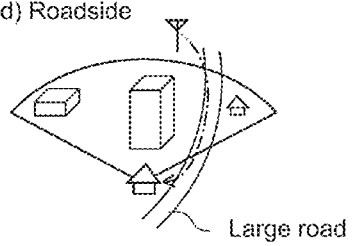

FIG.6

⟨Correction value based on quota analysis (correction-value determination table)⟩

※T: Target building, BS: Base station

| Type | Building area ratio of T in sector | Condition | | | | | | | Correction value ($r_1$) |
|---|---|---|---|---|---|---|---|---|---|
| | | BS height (altitude+antenna) | BS antenna height | Distance between T and BS | BS directivity direction | Number of buildings higher than T | Width of road next to T | ... | |
| Over-building (locally and heavily built-up) | 30% to 31%, all sectors | $L_1$m~ | — | — | — | — | — | ... | +(a)dB |
| | — | — | $L_3$m~ | ~$L_4$m | — | — | — | ... | |
| | — | — | — | ~$L_5$m | — | — | — | ... | |
| | — | $L_2$m~ | — | ~$L_6$m | Direction of T | — | — | ... | |
| Over-building (locally behind building) | — | — | — | — | — | N or more | — | ... | +(b)dB |
| | — | — | — | $L_7$m~ | Direction of T | — | — | ... | |
| | — | — | — | — | — | N or more | — | ... | |
| Open | — | — | — | — | Direction of T | — | $L_8$m~ | ... | +(c)dB |
| | — | — | — | — | — | — | $L_9$m~ | ... | |
| Roadside | — | — | — | — | — | — | $L_{10}$m~ | ... | +(d)dB |

FIG.7
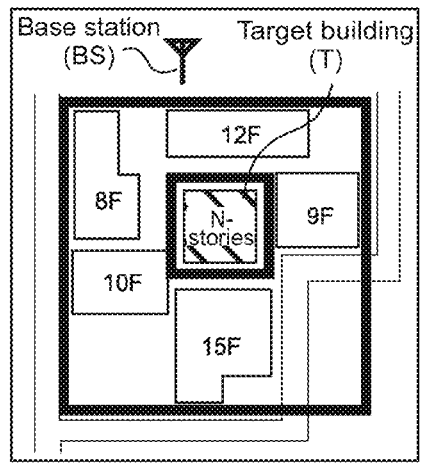
(a) Square
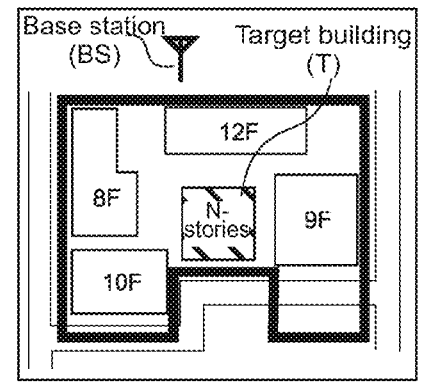
(b) Square-cornered C
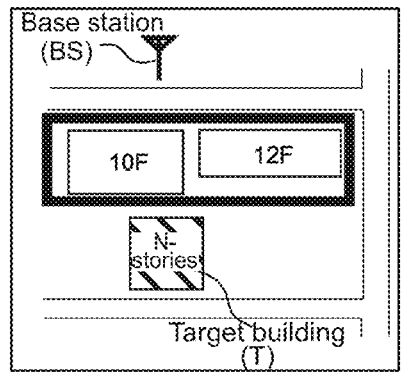
(c) I
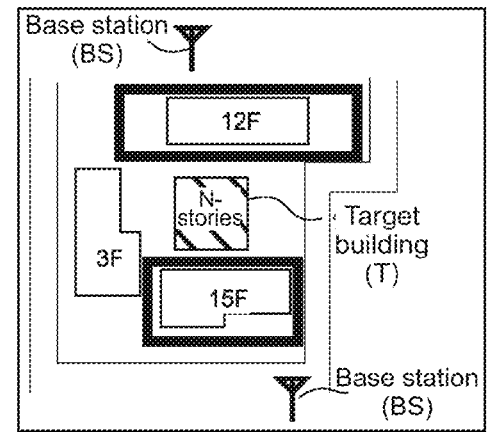
(d) Parallel
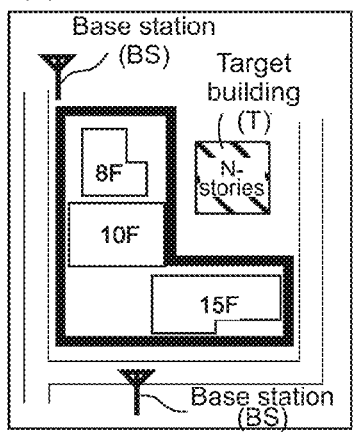
(e) L
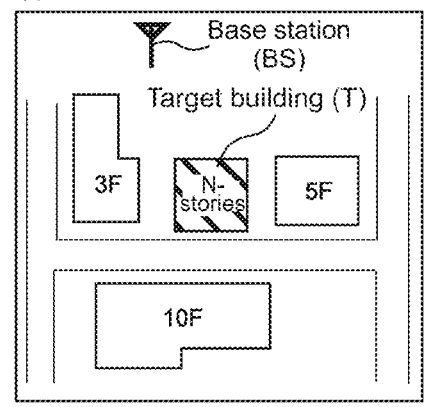
(f) Open FIG.8
(a) ⟨Conditions of neighboring buildings⟩
  1) N-stories or more
  2) Distance between neighboring building and target building is L m or less
  3) Shield 50% or more of one side of target building (shielding ratio is 50% or more)
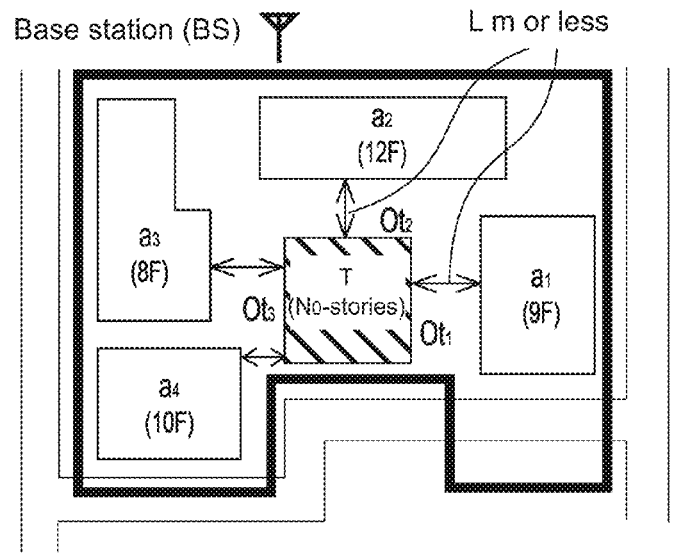
(b) ⟨Calculation of shielding ratio⟩
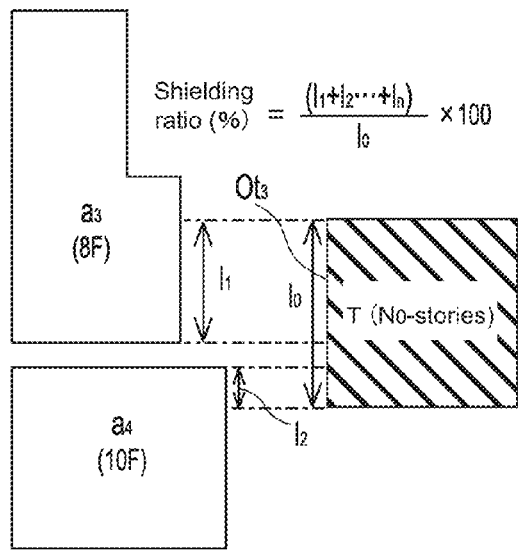
$$\text{Shielding ratio (\%)} = \frac{(l_1 + l_2 \cdots + l_n)}{l_0} \times 100$$

FIG.9

⟨Correction value based on topology analysis
(correction-value determination table)⟩

※T: Target building, BS: Base station

| Topology shape | Vision of base station | | Correction-target condition |
|---|---|---|---|
| | Open | Close | |
| Open | +(a)dB | — | All |
| I | +(b)dB | −(c)dB | All |
| L | +(d)dB | −(e)dB | All |
| Parallel | −(f)dB | −(g)dB | All |
| Square-cornered C | −(h)dB | −(i)dB | Partial irradiation ratio is 50% or more, distance between BS and T is $L_1$ m to $L_2$ m, and floor area is S m² or less |
| Square | — | −(j)dB | Distance between BS and T is $L_3$ m to y |

Correction value ($\Gamma_2$)

FIG.11
(a) Flat open (+(a)dB)
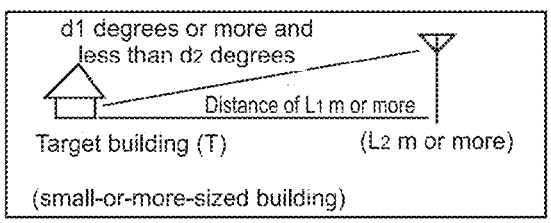
(b) High open (+(b)dB)
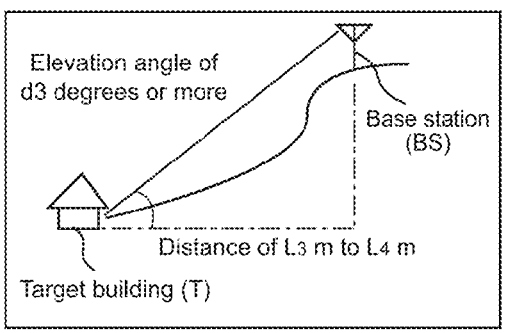
(c) Depression (-(c)dB)
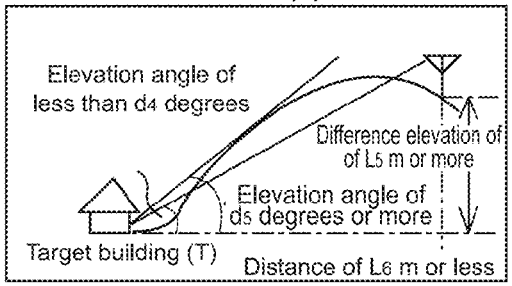
(d) Foot of mountain (+(d)dB)
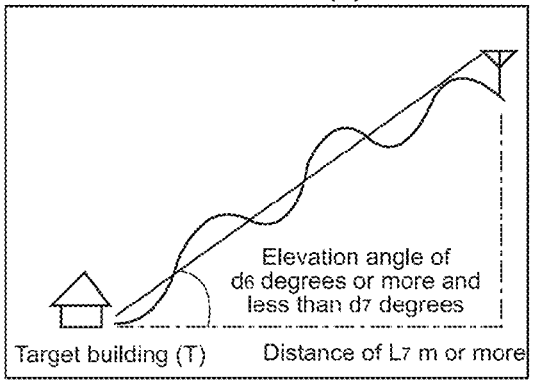
(e) Two stations (+(e)dB)
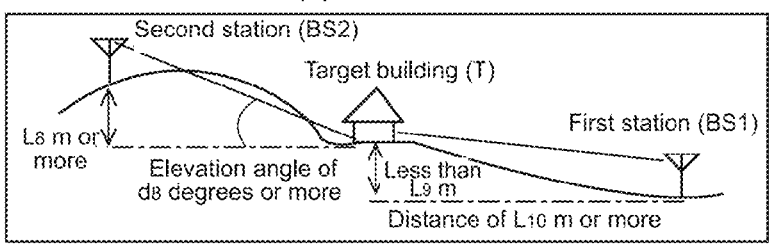

FIG.15
(A) Distribution of difference between estimated value (A-value) and measured value
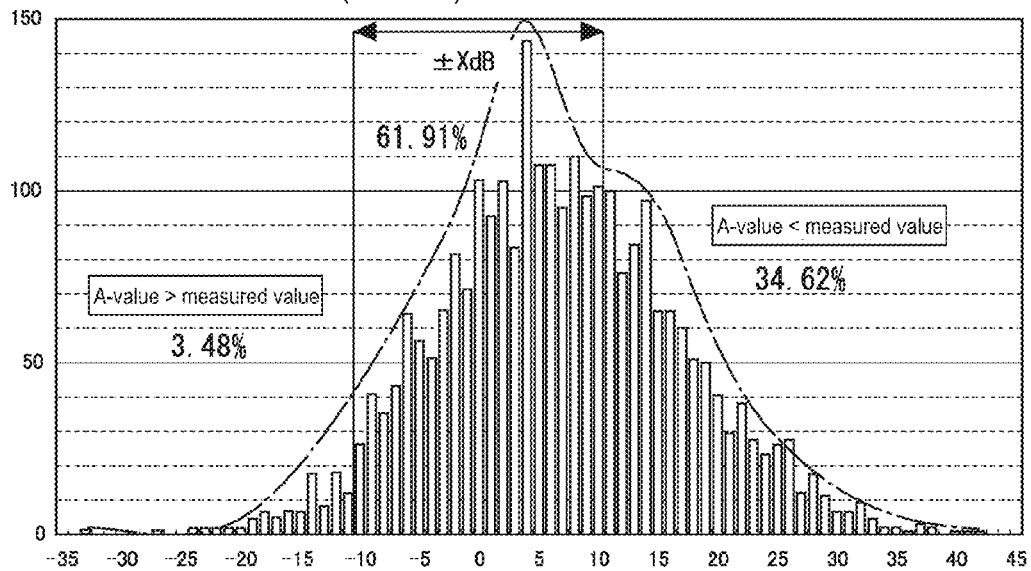
(B) Distribution of difference between analysis value and measured value after local-analysis correction
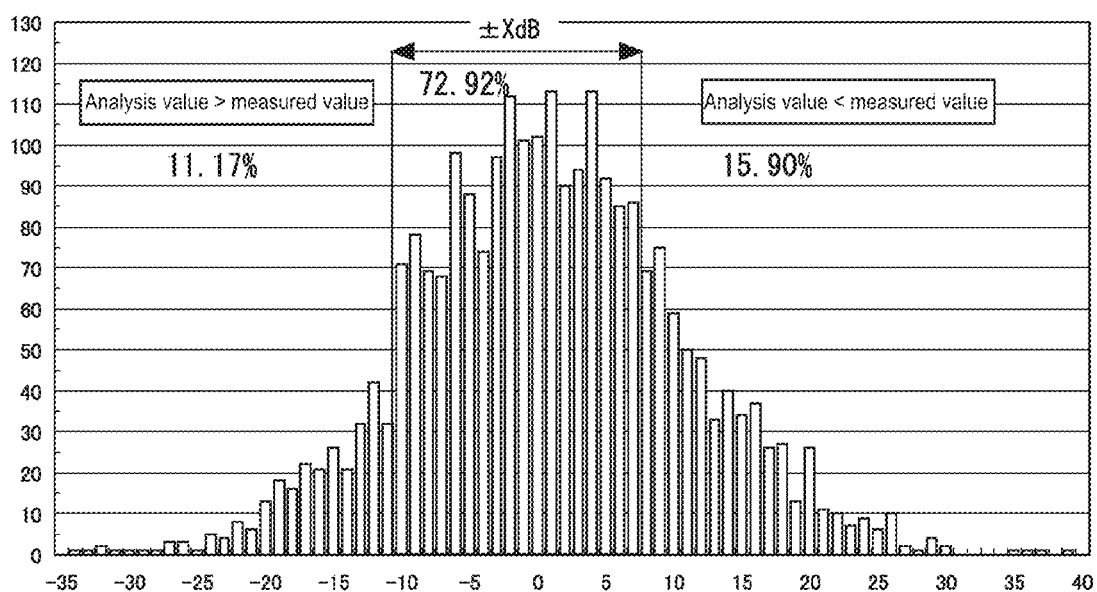

FIG.16
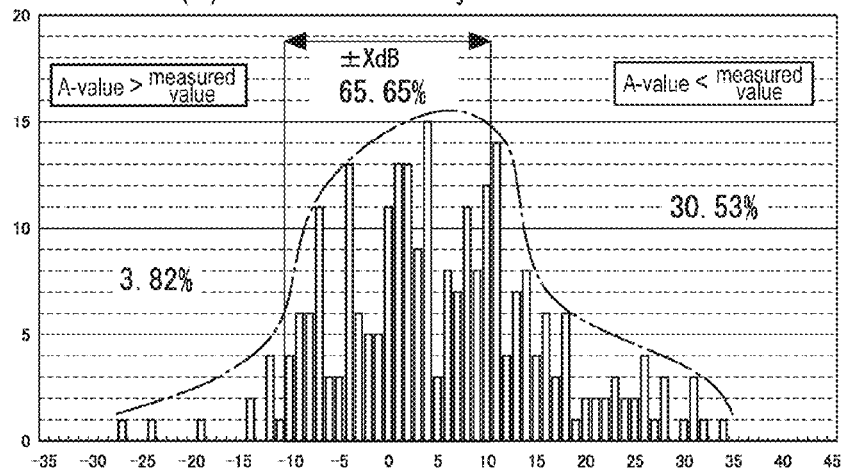
(A) Before local-analysis correction
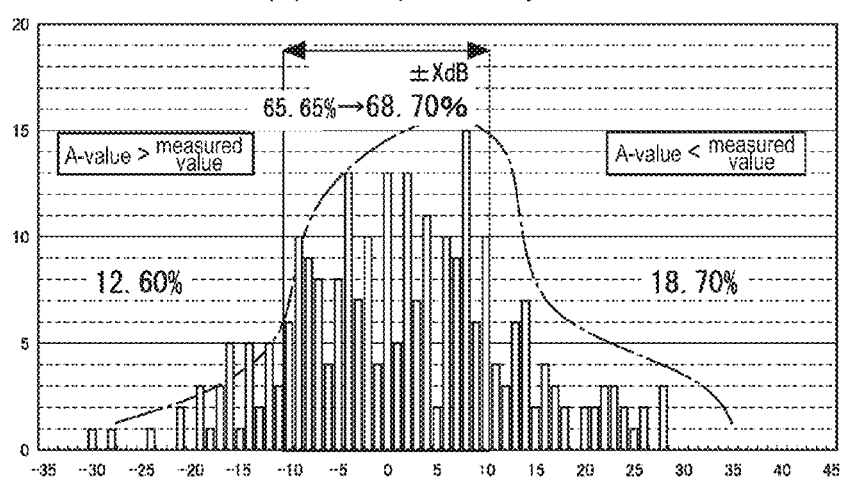
(B) After quota analysis
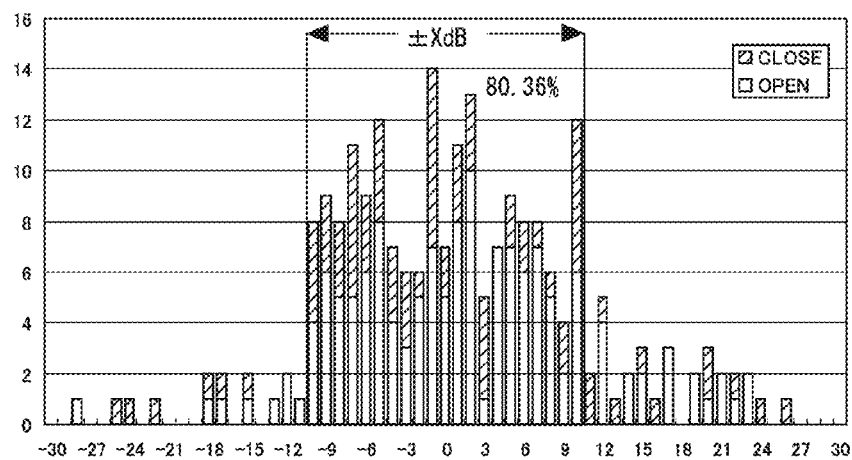
(C) After topology analysis FIG.17
(A) Topology analysis (open)
(Number of analysis targets: 53 cases)
(A1) Before correction
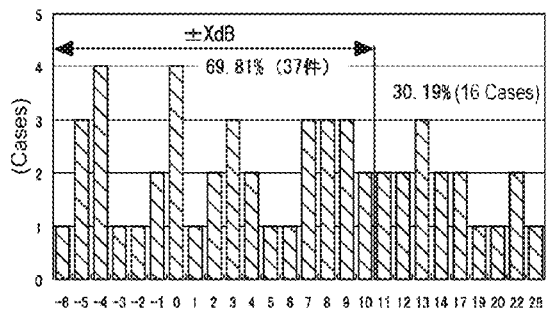
(A2) After topology analysis
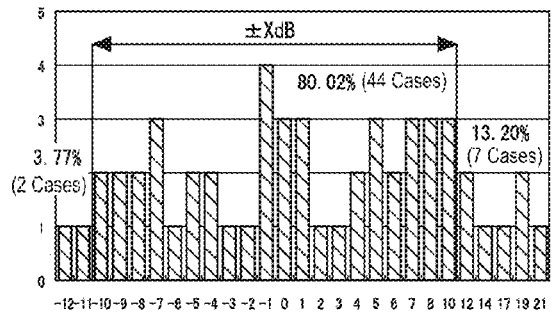
(B) Topology analysis (I)
(Number of analysis targets: 42 cases)
(B1) Before correction
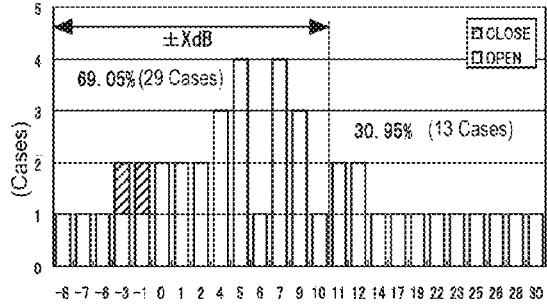
(B2) After topology analysis
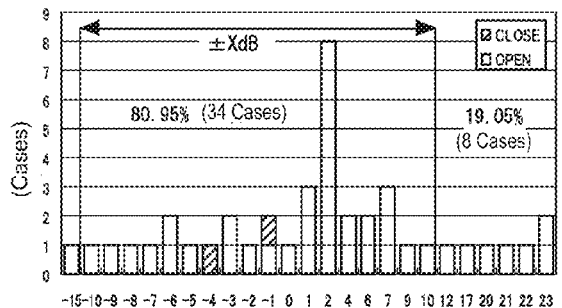

FIG.18

⟨Result of topology analysis⟩

| Type | | Number of analysis targets | Number of consistency | Consistency rate | Number of inconsistency | Inconsistency rate |
|---|---|---|---|---|---|---|
| L | Before correction | 30 | 25 | 83.33% | 5 | 16.67% |
| | After correction | 30 | 26 | 86.67% | 4 | 13.33% |
| Parallel | Before correction | 27 | 15 | 55.56% | 12 | 44.44% |
| | After correction | 27 | 18 | 66.67% | 9 | 33.33% |
| Square-cornered C | Before correction | 51 | 36 | 70.59% | 15 | 29.41% |
| | After correction | 51 | 41 | 80.39% | 10 | 19.61% |
| Square | Before correction | 21 | 13 | 61.90% | 8 | 38.10% |
| | After correction | 21 | 17 | 80.95% | 4 | 19.05% |

FIG.19           ⟨Quota analysis⟩
(A) Over-building (locally and heavily built-up)
(Number of analysis targets: 13 cases)
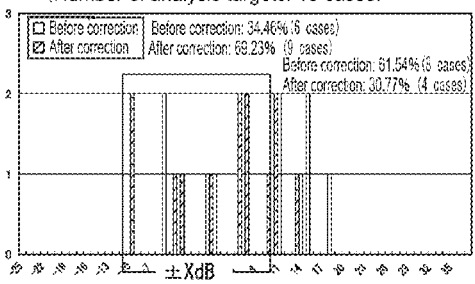
(B) Over-building (locally behind building)
(Number of analysis targets: 12 cases)
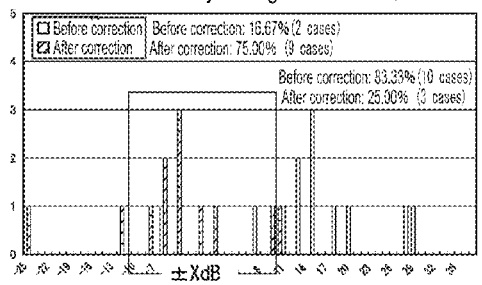
(C) Open
(Number of analysis targets: 36 cases)
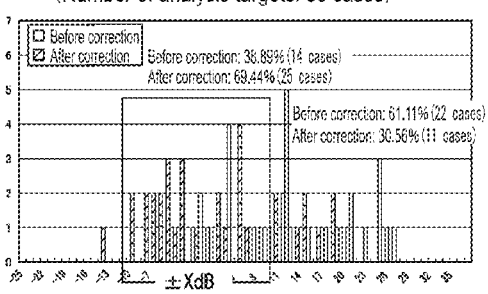
(D) Roadside
(Number of analysis targets: 73 cases)
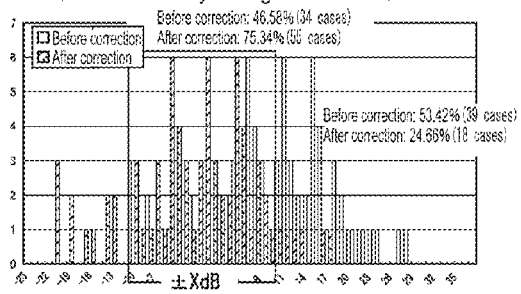

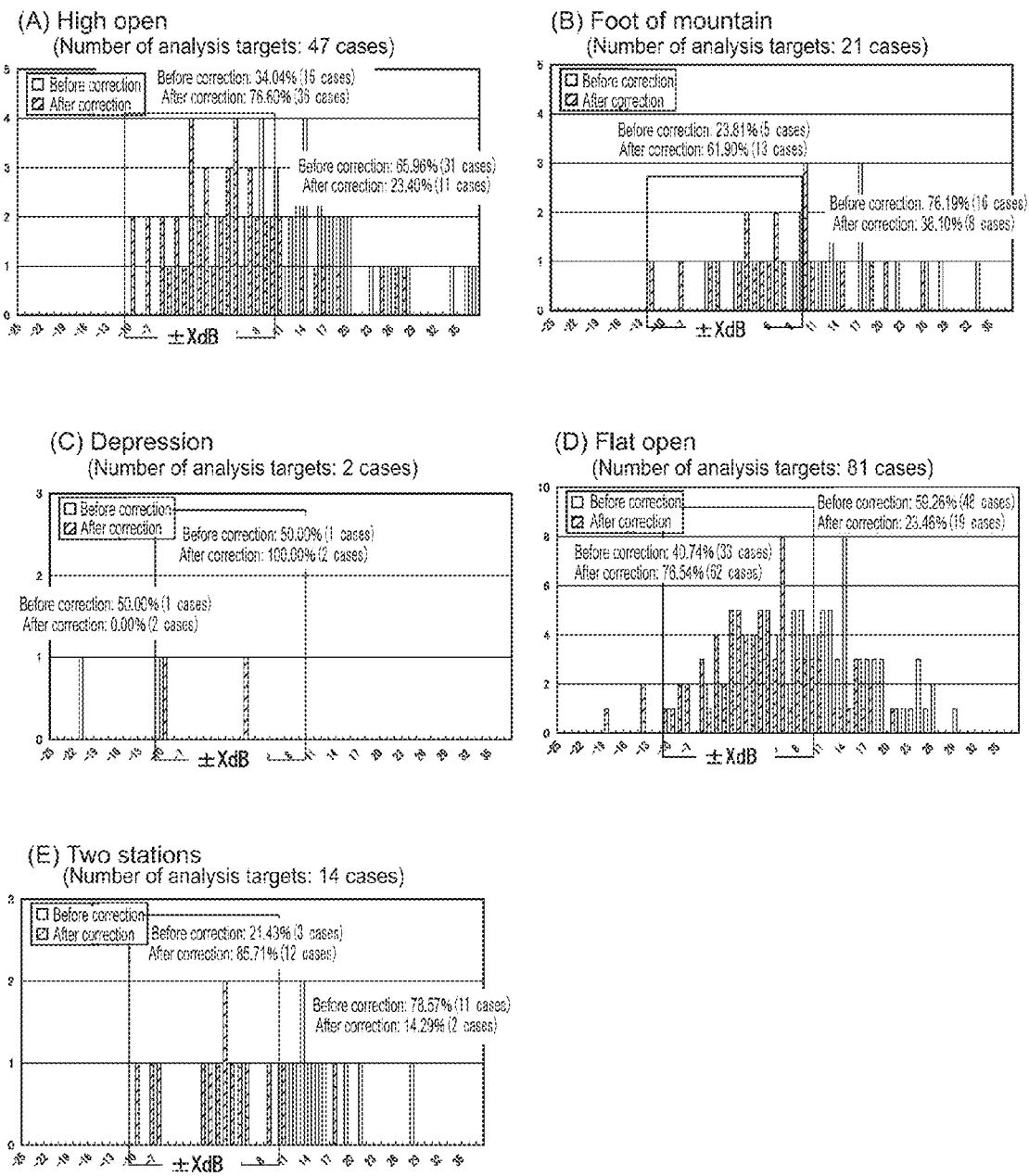

COMMUNICATION CHARACTERISTIC ANALYZING SYSTEM, COMMUNICATION CHARACTERISTIC ANALYZING METHOD, AND COMMUNICATION CHARACTERISTIC ANALYZING PROGRAM

CROSS-REFERENCE TO RELATED APPLICATIONS

This application is the U.S. national stage application of International Patent Application No. PCT/JP2010/004657, filed Jul. 21, 2010, the disclosure of which is incorporated herein by reference in its entirety.

TECHNICAL FIELD

The present invention relates to a wireless communication characteristic analysis system used for base-station installation design (cell site design) executed by a mobile wireless communication system, a communication characteristic analysis method, and a communication characteristic analysis program causing a computer system to execute the analysis method.

BACKGROUND ART

Conventionally, in cell site design, in most cases, indoor/outdoor communication-environment measured values collected by radio-wave measuring vehicles, area testers, and experiment stations, and simulation results (estimated values) of radio-wave propagation characteristic simulated by a computer are both used, and kinds of base stations, installation site candidates, and the like are determined (Non-patent Document 1). In the computer simulation, in general, wireless communication characteristic such as radio wave passages or propagation loss is calculated based on geographical information of topography, buildings, and the like and based on specific data of a base station.

In the simulation, in order to improve analysis accuracy, a plurality of analysis methods are sometimes used depending on regional characteristics of calculation-target areas. For example, the following Patent Document 1 discloses that Sakagami model is used for urban areas and Okumura-Hata model is used for suburban areas (paragraph [0029]). Further, Non-patent Documents 2 discloses that an optimum model is selected from a plurality of radio-wave-propagation estimation models such as ray trace (ray launching method), Okumura-Hata model, Sakagami model, and free-space model for each of a plurality of radio-wave propagation environments such as urban areas, suburban areas, and indoor areas, and that radio-wave propagation simulation is executed.

That is, according to statistical analysis methods such as Okumura-Hata model and free-space model, it is possible to execute simulation with a high degree of accuracy and at high speed for a suburban area in which there are a small number of shield objects and vision area of a base station is wide, but desired accuracy cannot be obtained for an urban area in which there are many buildings or objects which affect radio wave propagation, which is problematic. Because of this, it is effective to analyze an urban area based on a quasi-experience model such as Sakagami model or based on a deterministic analysis method such as ray tracing method (ray launching method or imaging method).

Further, Patent Document 2 discloses an invention capable of reducing a calculation-process amount in a case of estimating radio-wave receiving characteristic in a service area based on imaging method. According to this invention, constructions (buildings and the like) in the vision of a sending point (base station) and constructions in the vision of a receiving point (mobile station) are only considered, whereby a target of tracing a passage of a radio wave (ray) from a sending point to a receiving point is minimized, and calculation process may be performed at an extremely high speed (claim 1, paragraph [0022], and the like).

Further, Patent Document 3 discloses an invention in which, in a case of calculating a visibility rate in an area covered by a base station, a visible side surface of a visible building in the area is recognized, and a visibility determination point is set on a straight line that forms the side surface. As a result, according to this invention, a calculation amount is greatly reduced compared to a case where a plurality of grid points on a roof surface of a building and a building center point are set as determination points. Further, in accordance with a mode in which a wireless-station antenna is installed on a balcony, a building wall surface, or the like, this invention is capable of executing determination more realistically and with a higher degree of accuracy.

Non-patent Document 1: "Computer Aided Practical Cell Design System" NTT DoCoMo Technical Journal Vol. 4, No. 1, pp. 28-31, 1996-04

Non-patent Document 2: http://www.kke.co.jp/news/2008/pdf/NewsRelease_wireless.pdf Patent Document 1: Japanese Patent Application Laid-open No. 2004-304302 (paragraph [0029])

Patent Document 2: Japanese Patent Application Laid-open No. 2005-72667 (claim 1, paragraph [0022])

Patent Document 3: Japanese Patent Application Laid-open No. 2006-352551 (claim 1, paragraph [0018])

DISCLOSURE OF THE INVENTION

Problem to be Solved by the Invention

Meanwhile, in analysis methods of the above-mentioned cell site design, an area attribute of a mesh in an urban area or a suburban area is determined based on the ratio (occupied area ratio) of shield objects such as high-rise buildings and undulation of lands in a mesh, height, altitude, and the like. Then, communication characteristic is calculated for each mesh based on an analysis method that matches the area attribute. Because of this, it is impossible to obtain local communication characteristic of part of a mesh.

Specifically, in the statistical analysis method such as Okumura-Hata model or free-space model, if conditions in which distance between the center point of a mesh and a base station is within a predetermined range, in which height of a building in the mesh is a predetermined value or less, in which the number of stories of a building in the mesh is a predetermined value or less, in which there is no high-rise building on a passage, and the like, are satisfied, the entire mesh is evaluated as "good communication characteristic" based on statistical process. Because of this, for example, in a case where an area around a low-rise building, which is surrounded by multi-story mid-rise buildings in four directions, is a dead area locally, the dead area is not obvious unless verification process is performed based on measured values when dealing with a complaint from a user.

To the contrary, even in a case of a low-rise building next to a high-rise building in the center of a big city, if the direction of the nearest base station is visible because there is a road, a parking space, or the like, communication characteristic is good. In spite of this, if the deterministic analysis method is applied as it is, the entire mesh including the low-rise building may be evaluated as "countermeasure-necessary area". As a result, it is necessary to take countermeasures to eliminate the dead area (on-site actual measurement, provision of new base station, repeater, or the like, adjustment of interference between base stations, adjustment of sector direction or output, or the like).

Here, in order to identify a dead area, a mesh division unit may be made smaller (about several m), communication-characteristic analysis unit may not be the unit of mesh but may be the unit of building, and an estimated value of communication characteristic of a mesh is verified with reference to actual measured data.

However, even if the dividing unit of a mesh is smaller, as long as criteria of selecting a method of determining an area attribute is the same and as long as a method of analyzing an area attribute is the same, there is a limitation to improve analysis accuracy. With consideration of demerits in which the number of analysis-targets increases and in which the calculation amount increases enormously, this is not an effective countermeasure.

Further, if communication characteristic is analyzed for each building in detail, all the tens of millions of buildings in Japan are analyzed, which takes a lot of time and money and is unrealistic. Note that a method of narrowing down analysis-targets disclosed in the above-mentioned Patent Document 2, 3 is a method of previously identifying a candidate area in which a base station or the like is to be installed, i.e., a dead area, and narrowing down an analysis-target building therefrom. So this method cannot be used in a case of narrowing down an analysis-target from tens of millions of buildings.

Further, in a case where an estimated value is verified with reference to actual measured data, if Japan is divided into meshes of 50 to 500 m square, the total number of meshes in Japan is one and a half million or more. So it is unrealistic to collect actual measured data for all of them, and to verify estimated values of communication characteristic. Further, even if verification-target meshes are narrowed down randomly or based on an identification criterion in order to reduce a calculation amount or costs, this is merely the trade-off for accuracy of identifying a dead area and is not a fundamental countermeasure.

The present invention has been made to solve the above-mentioned problems. It is an object of the present invention to provide a communication characteristic analysis system capable of improving communication-characteristic analysis accuracy while reducing a calculation amount to the minimum, capable of identifying a local dead area, and capable of providing information useful to cell site design, a communication characteristic analysis method, and a communication characteristic analysis program causing a computer to execute the method.

Means for Solving the Problem

To solve the above-mentioned problems, a communication characteristic analysis system according to an embodiment of the present invention includes an area-attribute determination-criterion storage section, an analysis-method storage section, a referential-estimated-value storage section, an area-attribute determining means, a target-building identifying means, and a local-analysis means.

The area-attribute determination-criterion storage section stores a determination criterion, the determination criterion being used to determine two or more area attributes, the area attribute being of a predetermined area on a map. The area attribute is classified based on object data or statistical data of the area.

The analysis-method storage section stores a plurality of local-analysis methods of communication characteristic in relation to the area attributes, respectively.

The referential-estimated-value storage section stores an estimated value of communication characteristic (hereinafter, "referential estimated value") in relation to the area. The referential estimated value is calculated for each predetermined area on the map based on a method different from a plurality of local-analysis methods stored in the analysis-method storage section.

The area-attribute determining means determines an area attribute of an analysis-target area selected from the area based on object data or statistical data of the area according to the area-attribute determination criterion.

The target-building identifying means receives a designated building being a target of local analysis (hereinafter, "target building") out of buildings in the analysis-target area.

The local-analysis means searches the analysis-method storage section for a local-analysis method in relation to a determined area attribute. The local-analysis means locally analyzes communication characteristic of a target building. Further, the local-analysis means corrects the referential estimated value of an analysis-target area based on the analysis result, and outputs the corrected value as a communication-characteristic value of a target building.

Here, "local analysis" in this specification indicates the process of independently analyzing or correcting communication characteristic of not an area having predetermined area such as a mesh but a particular building irrespective of the kind of analysis method.

The communication characteristic analysis system according to another embodiment of the present invention includes an area-attribute determination-criterion storage section, an analysis-method storage section, an area-attribute determining means, and a local-analysis means.

The area-attribute determination-criterion storage section stores a determination criterion, the determination criterion being used to determine two or more area attributes, the area attribute being of a predetermined area on a map. The area attribute is classified based on object data or statistical data of the area.

The analysis-method storage section stores a plurality of local-analysis methods of communication characteristic in relation to the area attributes, respectively, the plurality of local-analysis methods including topology analysis, quota analysis, and geographic feature analysis.

The area-attribute determining means determines an area attribute of a selected analysis-target area based on object data or statistical data of the area according to the area-attribute determination criterion.

The local-analysis means searches the analysis-method storage section for a local-analysis method in relation to a determined area attribute. The local-analysis means locally analyzes communication characteristic of an analysis-target area based on the analysis method.

A communication characteristic analysis method according to another embodiment of the present invention is realized by a computer storing, in a storage device, a determination criterion of an area attribute, analysis methods of communication characteristic, and an estimated value of communication characteristic (referential estimated value).

The communication characteristic analysis method includes an area-attribute determining step, a target-building identifying step, and a local-analysis step.

The determination criterion is used to determine two or more area attributes, the area attribute being of a predetermined area on a map. The area attribute is classified based on object data or statistical data of the area.

The plurality of local-analysis methods are of communication characteristic in relation to the area attributes, respectively.

The referential estimated value is calculated for each predetermined area on the map based on a method different from the local-analysis methods.

The area-attribute determining step includes determining an area attribute of an analysis-target area selected from the area based on object data or statistical data of the area according to the area-attribute determination criterion.

The target-building identifying step includes receiving a designated building being a target of local analysis (hereinafter, "target building") out of buildings in the analysis-target area.

The local-analysis step includes searching the analysis-method storage section for a local-analysis method in relation to a determined area attribute. The local-analysis step includes locally analyzing communication characteristic of a target building. The local-analysis step includes correcting the referential estimated value of an analysis-target area based on the analysis result. Further, the local-analysis step includes outputting the corrected value as a communication-characteristic value of a target building.

A communication characteristic analysis program according to another embodiment of the present invention causes a computer storing, in a storage device, a determination criterion of an area attribute, analysis methods of communication characteristic, and an estimated value of communication characteristic (referential estimated value) to execute an area-attribute determining step, a target-building identifying step, and a local-analysis step.

The determination criterion is used to determine two or more area attributes, the area attribute being of a predetermined area on a map. The area attribute is classified based on object data or statistical data of the area.

The plurality of local-analysis methods are of communication characteristic in relation to the area attributes, respectively.

The referential estimated value is calculated for each predetermined area on the map based on a method different from the local-analysis methods.

The area-attribute determining step includes determining an area attribute of an analysis-target area selected from the area based on object data or statistical data of the area according to the area-attribute determination criterion.

The target-building identifying step includes receiving a designated building being a target of local analysis (hereinafter, "target building") out of buildings in the analysis-target area.

The local-analysis step includes searching the analysis-method storage section for a local-analysis method in relation to a determined area attribute. The local-analysis step includes locally analyzing communication characteristic of a target building. The local-analysis step includes correcting the referential estimated value of an analysis-target area based on the analysis result. Further, the local-analysis step includes outputting the corrected value as a communication-characteristic value of a target building.

BRIEF DESCRIPTION OF DRAWINGS

FIG. 5 are diagrams showing examples of sector types of quota analysis.

FIG. 6 is a diagram showing an example of conditions and correction values of each sector type of quota analysis.

FIG. 7 are diagrams showing examples of topology shapes of topology analysis.

FIG. 8 are schematic diagrams for explaining a condition of a shield-building and a shielding ratio of topology analysis.

FIG. 9 is a diagram showing an example of conditions and correction values of each topology shape of topology analysis.

FIG. 11 are diagrams showing examples of geographical objects of geographic feature analysis.

FIG. 15 are graphs showing comparison of analysis results (A-values) obtained by an existing RF simulator and local-analysis correction values obtained by the analysis system of this embodiment with measured values, and showing a verification result.

FIG. 16 are graphs similarly showing comparison of local-analysis results with measured values of a big city, and showing a verification result.

FIG. 17 are diagrams showing correction results of topology analysis of an "open" topology and an "I" topology.

FIG. 18 is a table showing correction results of topology analysis of an "L" topology, a "parallel" topology, a "square-cornered C" topology, and a "square" topology.

FIG. 19 are graphs showing correction results for a plurality of sector patterns of quota analysis, respectively.

FIG. 20 are graphs showing correction results for a plurality of geographical patterns of geographic feature analysis.

BEST MODE FOR CARRYING OUT THE INVENTION

Hereinafter, embodiments of the present invention will be described with reference to the drawings.

The present invention relates to a technology capable of executing cell site design accurately and effectively by using Geographical Information System (GIS). GIS is a system for integrally managing/processing digitized map (geographical) data, and statistical data or data associated with a location such as attribute information of a location, for performing sophisticated analytical analysis, and for performing visual display. GIS includes a database, in which map data and other data are in relation to each other, and computer programs for searching for the information, analyzing the information, displaying the information, and the like.

Figure 1:
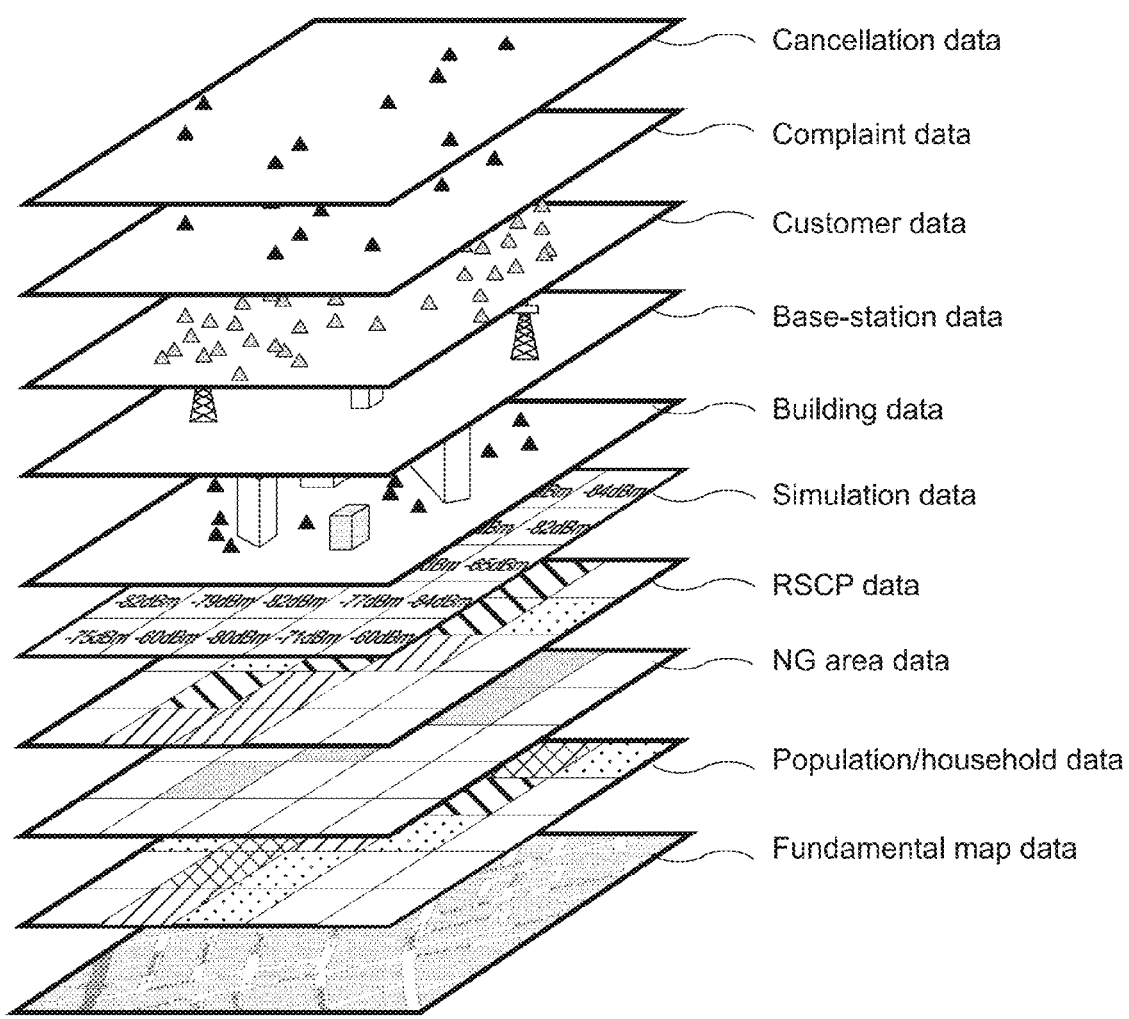
FIG. 1 is a schematic diagram showing a hierarchical structure of map data of a communication characteristic analysis system according to an embodiment of the present invention.

Here, as shown in FIG. 1, map data of this embodiment has a hierarchical structure in which the following plurality of data layers are stacked on a fundamental map data layer such that they are in relation to each other.

1) Population/household data layer, which shows daytime population, night-time population, the number of households, and the like for each mesh.

2) NG area data layer, which shows areas each having a measured value of communication characteristic equal to or less than a reference value.

3) Simulation data layer, which shows communication characteristic calculated by an existing RF simulator for each mesh.

4) RSCP (Received Signal Code Power) data layer, which is calculated for each mesh based on simulation data.

5) Building data layer, which shows height, floor area, and the like of each building.

6) Base-station data layer, which shows an installation location, height, an output level, an apparatus model, and the like of each base station.

7) Customer data layer, which shows an address, a building name, and the like of each customer.

8) Complaint data layer, which records complaints about communication characteristic such as "having trouble getting connection" and "connection is broken so fast", shows complaint data such as an address of each customer and recorded response, and shows improvement-apparatus data identifying each location in which a communication apparatus for locally improving a communication environment is installed.

9) Cancellation data layer, which shows an address of each disconnected customer, cancellation date, and the like.

Figure 2:
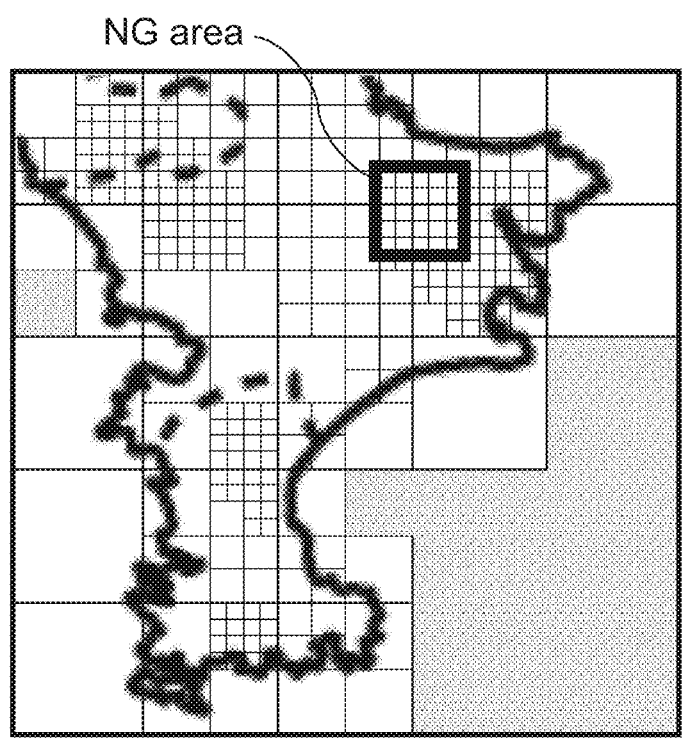
FIG. 2 is a diagram showing a mesh structure of the same map data.

As shown in FIG. 2, the fundamental map data layer is divided into a number of meshes, which have different areas depending on population density, building density, and the like. For example, in a case where a mesh unit is 500 m, Japan is divided into about one and a half million meshes. Of those, about half a million meshes, which show steady/non-steady resident areas, can be communication-characteristic analysis-target areas. FIG. 1 shows some meshes of FIG. 2, which are enlarged. Further, the NG area shown in FIG. 2 with a bold line is a group of meshes as a candidate for local analyses (described later).

(Outline of Preferable Embodiments of the Present Invention)

According to a preferable embodiment of the present invention, the analysis-method storage section stores topology analysis, quota analysis, or geographic feature analysis as the local-analysis method in relation to the area attribute. According to any local-analysis method, it is possible to correct a referential estimated value based on a statistical analysis method according to an area attribute with a high degree of accuracy.

According to a preferable embodiment of the present invention, the communication characteristic analysis system further includes a map-data storage section storing map data including fundamental map data, population/household data, and building data.

The area-attribute determination-criterion storage section stores a determination criterion, the determination criterion being used to determine two or more area attributes, the area attribute being classified based on object data or statistical data of one of population, households, and buildings in an area.

The area-attribute determining means determines an area attribute of an analysis-target area based on population/household data and building data in the map-data storage section according to the area-attribute determination criterion.

According to this configuration, it is possible to determine a plurality of area attributes promptly based on statistical data such as population and the number of buildings, for example.

According to a preferable embodiment of the present invention, the map-data storage section stores building data and/or population/household data for each area, the area being obtained by dividing fundamental map data by a predetermined range.

The area-attribute determination-criterion storage section stores a determination criterion, the determination criterion being based on object data or statistical data of one of daytime population, night-time population, daytime/night-time maximum population, population density, building density, average height of buildings, and maximum height of buildings, the determination criterion being used to determine area attributes of "big city", "local city", and "rural area".

According to this configuration, it is possible to determine area attribute according to a parameter which may affect communication characteristic, and to execute an optimum local analysis depending on the attribute. As a result, it is possible to narrow down an analysis-target area and to improve analysis accuracy of local analyses at the same time.

According to another preferable embodiment of the present invention, the analysis-method storage section stores quota analysis and topology analysis in relation to an area attribute "big city", stores geographic feature analysis in relation to an area attribute "rural area", and stores no analysis method in relation to an area attribute "local city".

The local-analysis means outputs, in a case where it is determined that an area attribute of an analysis-target area is "local city", a referential estimated value of the analysis-target area as a communication-characteristic value of the target building.

According to this configuration, it is possible to correct a referential estimated value only for an area, to which a local analysis is to be executed. As a result, it is possible to reduce a calculation amount to the minimum and to increase calculation speed.

According to another preferable embodiment of the present invention, the analysis-method storage section stores a plurality of analysis methods including topology analysis as local-analysis methods. Further, the analysis-method storage section includes a topology-shape storage section, the topology-shape storage section storing a shield-building determination criterion, a topology-shape determination criterion, and communication-characteristic correction values, the shield-building determination criterion being used to determine if a building neighboring an arbitrary target building (neighboring building) can be a shield-building shielding a radio wave from a base station in relation to distance and/or difference in height between the neighboring building and the target building, the topology-shape determination criterion being of a plurality of topology shapes, the topology shape being obtained by simplifying outlines of one or more shield-buildings, the communication-characteristic correction value being set for each topology shape.

The local-analysis means determines a topology shape around a target building with reference to the map-data storage section and the topology-shape storage section. The local-analysis means corrects a referential estimated value of an analysis-target area based on a communication-characteristic correction value of the topology shape, and outputs the corrected value as a communication-characteristic value of a target building.

The shield-building determination criterion is a criterion for determining if a building (neighboring building) neighboring an arbitrary target building can be a shield-building, which shields a radio wave from a base station in relation to distance and/or difference in height between the neighboring building and the target building.

The topology shape determination criterion is a criterion (condition for establishment) of a topology shape, which is obtained by simplifying outlines of one or more shield-buildings.

The communication-characteristic correction value is set for each topology shape.

According to this configuration, it is possible to simplify a communication environment around a target building and to obtain some patterns of communication environments, and analysis accuracy may be improved while reducing a calculation amount to the minimum.

According to another preferable embodiment of the present invention, the local-analysis means includes a building-data extracting means, a shield-building determining means, and a topology-analysis executing means for topology analysis.

The building-data extracting means extracts data on a location and height of a target building and data on a location and height of a building neighboring the target building from building data in the map-data storage section.

The shield-building determining means calculates distance and/or difference in height between an extracted neighboring building and a target building, and determines if the shield-building determination criterion is satisfied.

The topology-analysis executing means determines a topology shape around a target building based on presence/absence of a shield-building neighboring a target building, corrects a referential estimated value of an analysis-target area based on a communication-characteristic correction value of a determined topology shape, and outputs the corrected value as a communication-characteristic value of a target building.

According to this configuration, it is possible to execute a local analysis easily based on topology analysis.

According to another preferable embodiment of the present invention, the topology-shape storage section stores a determination criterion of a plurality of topology shapes, the plurality of topology shapes being classified based on presence/absence of a shield-building in N directions ($0 \leq N \leq 4$) out of four directions of a target building.

The topology-analysis executing means identifies N directions in which a shield-building exists with reference to location data of a building determined to be a shield-building and of a target building, and determines a topology shape.

According to this configuration, it is possible to further simplify a topology shape, and to easily execute local analyses.

According to another preferable embodiment of the present invention, the topology-shape storage section stores, as a shield-building determination criterion, a reference value of ratio (shielding ratio) of an outline in an arbitrary direction of a target building and length of a segment of the outline facing an outline of a neighboring building.

The building-data extracting means extracts a planer shape (outline) of a target building and a planer shape (outline) of a neighboring building from building data in the map-data storage section.

The topology-analysis executing means calculates shielding ratio in each direction of a target building based on an extracted outline of a target building and based on an extracted outline of a neighboring building, decides that a shield-building exists in a direction in which the shielding ratio is larger than the reference value, and determines a topology shape.

According to this configuration, it is possible to simplify various shield patterns of a target building and a neighboring building, and to execute local analyses easily.

According to another preferable embodiment of the present invention, the map-data storage section stores base-station data including location of a base station.

The topology-shape storage section stores, with respect to topology shapes in each of which at least one direction seen in a plan view is open, a communication-characteristic correction value for a case where a shield-building shields a base-station direction, and a communication-characteristic correction value for a case where a base-station direction is open, the communication-characteristic correction values being different from each other.

The topology-analysis executing means decides if a base-station direction of a determined topology shape is shielded or open with reference to base-station data, and extracts a communication-characteristic correction value from the topology-shape storage section.

According to this configuration, it is possible to output different correction values about the same topology shape depending on a location relation with a base station, and to further improve accuracy of local analyses.

According to another preferable embodiment of the present invention, the analysis-method storage section stores a plurality of analysis methods including quota analysis as local-analysis methods. The analysis-method storage section includes a sector-communication-characteristic correction-value storage section for quota analysis.

The map-data storage section stores base-station data including location of a base station.

The sector-communication-characteristic correction-value storage section stores a communication-characteristic correction value, the communication-characteristic correction value being set based on the number of buildings in a sector, the number of buildings to area of a sector (density), or ratio of total floor area of buildings to area of a sector (building ratio), and based on a direction of a base station whose communication area includes an arbitrary building, the sector being obtained by equally dividing a virtual circle having a predetermined radius and having the arbitrary building being the center into four portions.

The local-analysis means extracts a communication-characteristic correction value of a sector with reference to the map-data storage section and the sector-communication-characteristic correction-value storage section, corrects a referential estimated value of an analysis-target area based on the sector communication-characteristic correction value, and outputs the corrected value as a communication-characteristic value of a target building.

According to this configuration, it is possible to easily realize a local analysis based on quota analysis. Further, by executing the quota analysis and the topology analysis in combination, it is possible to further improve analysis accuracy of a big city, which is likely to exhibit variation in local communication characteristic.

According to another preferable embodiment of the present invention, the local-analysis means further includes a building-data extracting means, an in-sector building-data calculating means, a base-station-data identifying means, and a sector-communication-characteristic correction-value extracting means.

The building-data extracting means equally divides a virtual circle having a target building being the center into four sectors, and extracts building data in each sector with reference to fundamental map data and building data in the map-data storage section.

The in-sector building-data calculating means calculates the number of buildings in a sector, building density, or building ratio (hereinafter, collectively referred to as "in-sector building data") based on extracted building data.

The base-station-data identifying means identifies location of a base station whose communication area includes a target building with reference to base-station data in the map-data storage section.

The sector-communication-characteristic correction-value extracting means extracts a communication-characteristic correction value of the sector with reference to the in-sector building data, location of a base station, and the sector-communication-characteristic correction-value storage section.

According to this configuration, it is possible to execute quota analysis effectively based on in-sector building data.

According to another preferable embodiment of the present invention, the analysis-method storage section stores a plurality of analysis methods including geographic feature analysis as local-analysis methods. Further, the analysis-method storage section includes a shield-geographical-object storage section, the shield-geographical-object storage section storing a shield-geographical-object determination criterion and a communication-characteristic correction value for local-analysis methods.

The shield-geographical-object determination criterion is a criterion used to determine if a geographical object around an arbitrary target building can be a shield geographical object shielding a radio wave from a base station whose communication area includes a target building. The shield-geographical-object determination criterion includes at least one of distance between a geographical object and a target building, difference in height between a geographical object and a target building, an elevation angle between a geographical object and a target building, distance between a geographical object and a base station, difference in height between a geographical object and a base station, and an elevation angle between a geographical object and a base station as a parameter (hereinafter, "geographical-object parameter").

The communication-characteristic correction value is set for each of a plurality of geographical patterns classified depending on geographical data such as shape, size, and height of a shield geographical object.

The map-data storage section stores base-station data including location of a base station.

The local-analysis means determines a geographical pattern of a geographical object around a target building with reference to the map-data storage section and the shield-geographical-object storage section. The local-analysis means corrects a referential estimated value of an analysis-target area based on a communication-characteristic correction value of the geographical pattern, and outputs the corrected value as a communication-characteristic value of a target building.

According to this configuration, it is possible to easily execute a local analysis based on geographic feature analysis.

According to another preferable embodiment of the present invention, the local-analysis means further includes a data extracting means, a shield-geographical-object determining means, a geographical-pattern determining means, and a communication-characteristic-value outputting means for geographic feature analysis.

The data extracting means extracts building data of a target building, base-station data of a base station whose communication area includes a target building, and geographical data around a target building with reference to fundamental map data, building data, and base-station data in the map-data storage section.

The shield-geographical-object determining means calculates a value of the geographical-object parameter based on extracted data, applies the calculated value to a shield-geographical-object determination criterion, and determines if a shield geographical object exists.

The geographical-pattern determining means determines a geographical pattern based on geographical data of a shield geographical object.

The communication-characteristic-value outputting means searches the shield-geographical-object storage section for a communication-characteristic correction value of a determined geographical pattern, and outputs the communication-characteristic correction value as a communication-characteristic value of a target building.

According to this configuration, it is possible to execute geographic feature analysis easily depending on various shield geographical patterns.

According to another preferable embodiment of the present invention, the map-data storage section stores complaint data or improvement-apparatus data. The complaint data is data identifying location relating to a complaint, the complaint being about a communication environment obtained from a user of wireless communication service. The improvement-apparatus data is data identifying location at which a communication apparatus for locally improving a communication environment is installed.

The system further includes an analysis-target-area identifying means. The analysis-target-area identifying means identifies particular location on fundamental map data based on complaint data or improvement-apparatus data in the map-data storage section, and extracts an area including the particular location as an analysis-target area.

The area-attribute determining means determines an area attribute of an extracted analysis-target area.

According to this configuration, it is possible to estimate a dead area based on improvement-apparatus data, to identify an analysis-target area effectively, and to execute local analyses more effectively.

According to another preferable embodiment of the present invention, the communication characteristic analysis system further includes an indoor-communication-characteristic correction-value storage section, a building-specific communication-characteristic estimated-value storage section, an indoor-communication-characteristic correcting means, and an analysis-target-area selecting means.

The indoor-communication-characteristic correction-value storage section stores a correction value of indoor communication characteristic, the correction value being set depending on size or a type of a building (hereinafter, collectively referred to as "building type").

The building-specific communication-characteristic estimated-value storage section stores an estimated value of communication characteristic of a building on map data (hereinafter, "building-specific communication-characteristic estimated-value") in relation to each building, the building-specific communication-characteristic estimated-value being calculated based on a method different from analysis methods stored in the analysis-method storage section.

The indoor-communication-characteristic correcting means determines a building type of a building with reference to building data in the map-data storage section, and for correcting a building-specific communication-characteristic estimated-value of the building based on an in door-communication-characteristic correction value corresponding to the building type.

The analysis-target-area selecting means selects, as the analysis-target area, an area including a predetermined number or more of buildings each having a corrected building-specific communication-characteristic estimated-value equal to or less than a predetermined reference value.

According to this configuration, it is possible to narrow down an analysis-target area effectively and with a high degree of accuracy based on a corrected building-specific communication-characteristic estimated-value.

(Overall Flow)

Figure 3:
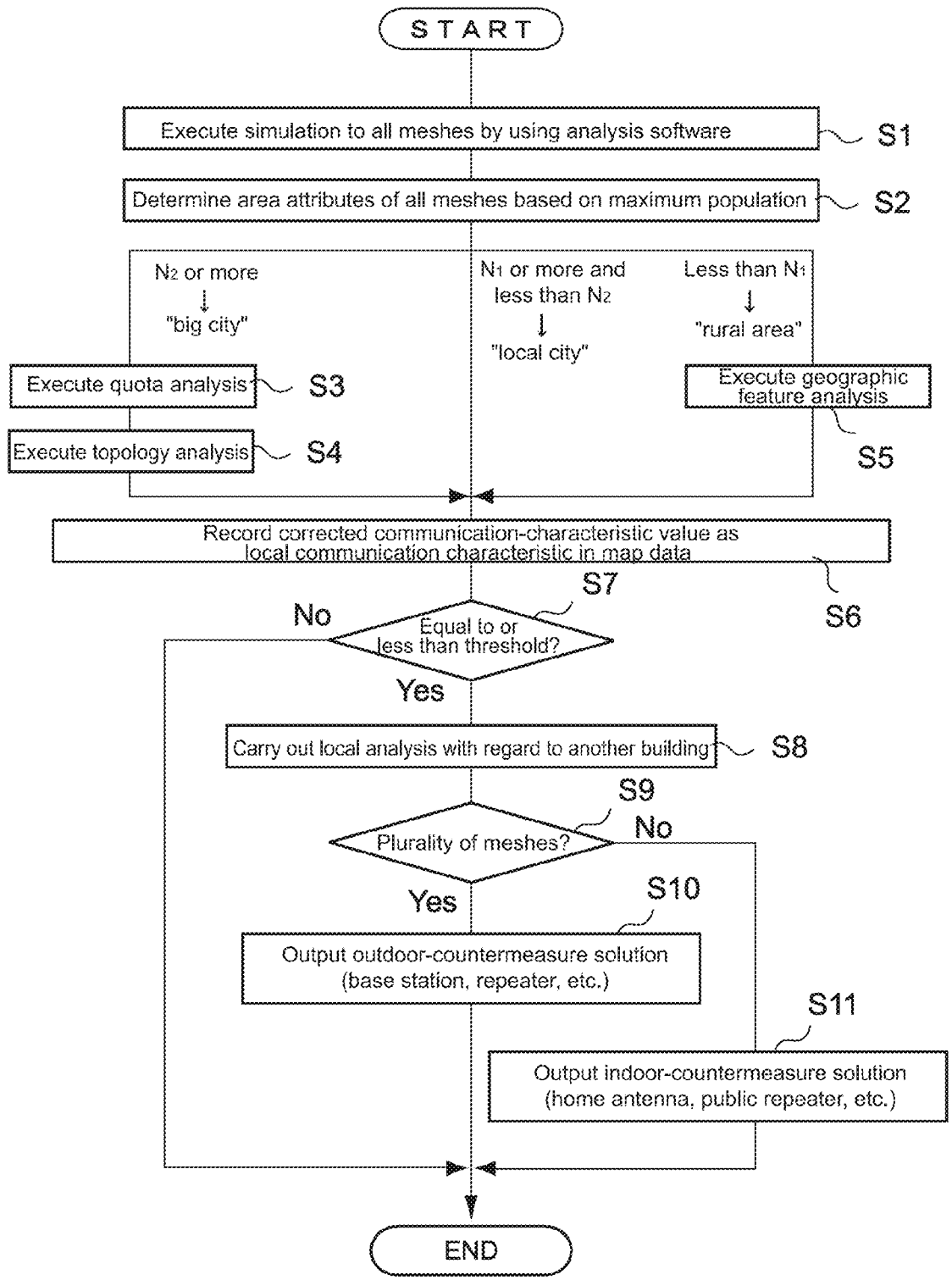
FIG. 3 is a flowchart showing entire process steps of the same.

Next, with reference to FIG. 3, an overall flow of this embodiment will be described.

S1: First, communication characteristic for all the meshes in an analysis-target area (whole of country, prefecture, state, county, municipality, borough, or the like) are calculated (simulated) by using known analysis software such as an RF simulator (S1). In this case, calculation is carried out with reference to building data (number of stories, height, floor area), geographical data (above sea level, and the like), base-station data (location, height, and the like), and the like in digital map data.

As the analysis software, for example, "Atoll" manufactured by Forsk (France) or software disclosed in Non-patent Document 2 may be used. Result calculated by the analysis software is output in a form of receiving rate (%) of a radio wave sent from the nearest base station or in a form of loss value (dBm) on a passage. In this specification, the output value is referred to as "communication-characteristic value". Further, in order to distinguish an output value, which is output from the existing analysis software, from an output value, which is output from the present system after local-analysis correction process, the former is referred to as "A-value" or "estimated value", and the latter is referred to as "local-analysis value" or "correction value". Note that, since an analysis method by existing analysis software is known, detailed description will not be made.

S2: Next, with reference to the population/household data (statistical data) in the mesh map data, an area attribute of each mesh is determined (S2). In this embodiment, meshes are classified into the following three attributes depending on maximum values (maximum population) of daytime population and night-time population.

Maximum population is less than N1: rural area.

Maximum population is N1 or more and less than N2: local city.

Maximum population is N2 or more: big city.

Here, "rural area", "local city", or "big city" has no relation to a municipality or the like (address data, etc.) as an administrative district unit, and is only based on maximum population in a mesh. So, for example, even if a mesh is in a big city (Yokohama, London, or the like) from a viewpoint of an administrative district, a mesh with a high proportion of a non-resident area such as a park, a lake, or a river may be classified into "rural area".

Further, with regard to a mesh classified into a rural area or a local city, it is preferable to calculate or extract object data such as density (total floor area/mesh area) of buildings, the average number of stories, the maximum number of stories, and the number of mid-to-high-rise buildings each having the predetermined number of stories or more, with further reference to building data in the map data, and preferable to revise a mesh having object data equal to or more than a reference value to a local city or a big city.

S3, S4, S5: Next, the A-value is locally corrected based on a determined area attribute. Specifically, quota analysis and topology analysis are carried out with regard to a mesh in a big city (S3, S4), and geographic feature analysis is carried out with regard to a mesh in a rural area (S5). There are a number of various objects (buildings, partial undulation of land, mountain forests, valleys, and the like) having a large effect on radio-wave propagation characteristic in a big city and a rural area, and communication characteristic are likely to be varied in a mesh locally. In the local analysis, an arbitrary target building in a target mesh is specified by a user, or a target building is specified randomly out of low-rise buildings and the like in the vicinity of the center of a mesh.

Meanwhile, the local analysis is not carried out with respect to a local city. Because the number and sizes of buildings are less likely to be varied in a mesh in a local city, standardized process such as a statistical method is capable of attaining enough accuracy. Note that, for example, in a case where it is determined that an A-value in a local city has a significant error according to verification based on actual measured data, local correction process may be carried out similar to the case of a big city or a rural area. Further, area attribute may be further segmentalized into, for example, "local city, downtown" and "local city, suburb", and correction process similar to the case of a big city or a rural area or different correction process may be carried out. In this case, the "different correction process" may include a case where the analysis method is similar to the case of a big city or a rural area while a correction value or an execution condition is different.

S6: After the correction process is finished, a corrected communication-characteristic value as local communication characteristic of a target building is recorded in map data such that the corrected communication-characteristic value is in relation to address and the like (S6). As necessary, such correction process is carried out with respect to all the buildings in a mesh and all the meshes in an NG area.

S7, S8, S9: Further, a communication-characteristic value of a target building is compared to a threshold (S7). In a case where the communication-characteristic value is equal to or less than the threshold (S7, Yes), the local analysis is carried out with regard to another building in the mesh or in an adjacent mesh in response to an instruction by a user or according to a program (S8). Then, it is determined that if a building equal to or less than the threshold lies astride a plurality of meshes (S9).

S10, S11: In a case where a building equal to or less than the threshold lies astride a plurality of meshes (S9, Yes), a base station (macro station) or a repeater (picocell) is newly installed, or outdoor-countermeasure solution such as adjustment of output from an existing base station is output in a predetermined format (countermeasures list, fixed message, or the like) (S10). Meanwhile, in a case where a building equal to or less than the threshold only exists locally (S9, No), indoor-countermeasure solution (such as home antenna, public repeater, indoor base station, or the like) with respect to the target building is output in a predetermined format (S11).

As described above, vast calculations with respect to a wide area are processed at high speed by an existing simulator, which performs a statistical method or the like. The analysis result (A-value) is narrowed down based on an area attribute of a mesh to thereby obtain a correction-target mesh. Local correction process is carried out by means of an analysis method appropriate for the area attribute. As a result, it is possible to improve analysis accuracy while decreasing a calculation amount. Further, since local analysis is carried out by the unit of building, it is possible to extract a local dead area, which is for example affected by building-and-geographical circumstances around a building and by location relation between the building and a base station, without performing field investigation and the like. It is possible to propose necessary solutions promptly.

Next, the local-analysis correction-process methods will be described in detail.

(Quota Analysis)

First, quota analysis, which is carried out with respect to a mesh having an area attribute "big city", will be described. The quota analysis is an analysis method of equally dividing a virtual circle having a predetermined radius and having a target building being the center into four sectors, and outputting a communication-characteristic correction value previously set depending on the number of buildings in a sector and the like. The quota analysis is carried out in order to correct an effect of attenuation by another building, which exists between a base station and a target building T.

Figure 4:
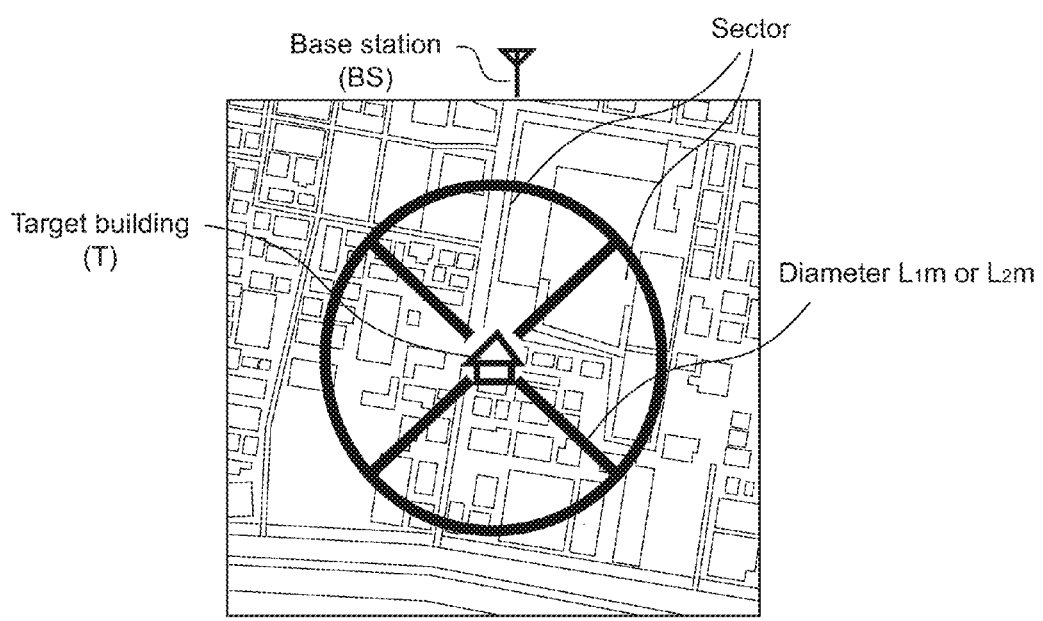
FIG. 4 is a schematic diagram for explaining quota analysis.

As shown in FIG. 4, according to the quota analysis, specifically, with reference to building data of map data of a mesh in a "big city", a target low-rise (for example, three-storied or less, or 10 m or less) building T is identified. Note that the target building T may be identified by receiving address, an identification number (customer number, telephone number, or the like) of a customer, or the like input by a user, or by receiving selection on map data. A circle having a predetermined radius is drawn on the map while the target building T is the center. The "predetermined radius" is determined depending on the size of the target building T. For example, in a case of a small-sized or middle-sized building having floor area of S m$^2$ or less, the predetermined radius is $L_1$ m, and, in a case where floor area is more than S m$^2$, the predetermined radius is $L_2$ m.

Next, the virtual circle is equally divided into four sectors, and all the buildings, at least part of each of which is included in any sector, are extracted. A building lying astride a plurality of sectors is sorted into any one sector depending on occupied area or the like. Further, with reference to base-station data of map data, location and height (height of antenna) of a base station BS, which is installed within a predetermined distance from the target building T, are identified.

Based on building data of each extracted building in each sector and based on base-station data, types, which are shown in FIGS. 5(a)-(d), of respective sectors are determined. The types of sectors are classified into four types, i.e., over-building (locally and heavily built-up), over-building (locally behind a building), open, and roadside, based on height of a building, distance between the building and a target, direction of the base station BS, and the like. Because reliability of communication characteristic or A-value is likely to increase in the order of over-building (locally and heavily built-up), over-building (locally behind a building), roadside, and open, correction values (described later) of A-values are set based on their attributes.

Here, "over-building" is further segmentalized into "locally and heavily built-up" (FIG. 5(a)) and "locally behind a building" (FIG. 5(b)). "Locally and heavily built-up" is calculated with reference to occupancy of floor area of buildings in a quota, the number of buildings in the quota, and the like. Further, "locally behind a building" indicates a case where there is a building (aa2 in FIG. 5(b)) having a predetermined height or more on a radio wave passage between the target building T and the base station BS although the area is not a heavily built-up. Note that, in a case where a sector has a plurality of attributes, it is preferable to determine that the sector has an attribute of lower communication characteristic. For example, in a case where a sector has an attribute of over-building (locally behind a building) and an attribute of roadside, it is determined that the sector has an attribute of over-building (locally behind a building).

The attribute of a sector determined as described above, floor area of the target building T, and the height (height of antenna) of the base station are applied to a correction-value determination table of FIG. 6, and a correction value (r1) of the target building T is identified.

(Topology Analysis)

Next, topology analysis, which is executed with respect to a mesh having an area attribute "big city", will be described. The topology analysis is an analysis method of substituting a simple shape for a complex shape and deriving identity of the shape, which is capable of reducing calculation amount with a high degree of accuracy. The topology analysis is mainly used to simplify a complex shape (structure) such as a cell or a molecule or time series variation, and to find out common characteristics, a tendency, or the like. In this embodiment, the topology analysis is applied to calculation (correction) of communication characteristic, and improved analysis accuracy and a high efficiency are achieved. That is, according to the topology analysis of this embodiment, it is determined if a building "a" in the vicinity of the target building T is a building shielding a radio wave with consideration of a relation between the building "a" and the nearest base station BS, a topology shape around the target building T is determined in the direction of the shield-building, a referential estimated value of analysis-target area is corrected based on a communication-characteristic correction value of the topology shape, and the corrected referential estimated value is output as a communication-characteristic value of the target building T.

As shown in FIG. 7, according to the topology analysis of this embodiment, six shapes, i.e., square, square-cornered C, L, parallel, I, and open, are set depending on a location relation between buildings around the target building T and the base station BS. With reference to FIG. 8, a method of determining those shapes will be described.

First, similar to the quota analysis, a target low-rise building is identified. Next, buildings $a_1$-$a_4$ neighboring the target building T and the base station BS installed within a predetermined distance from the target building T are extracted. It is determined if the extracted neighboring building $a_1$-$a_4$ satisfies conditions of distance (L m or less) between the building $a_1$-$a_4$ and the target building T and of height (N-stories or more) shown in FIG. 8(a). Here, all the buildings $a_1$-$a_4$ satisfy the conditions. Next, with respect to directions in which the buildings $a_1$-$a_4$ satisfying the conditions exist out of four directions (four sides) of the target building T, shielding ratio is calculated.

Shielding ratio (%) in each direction (side) is calculated based on the following Equation 1.

$$((\text{Length of outline } O_{an} \text{ of neighboring building facing outline } Ot_n \text{ of target building T}) \times 100)(\text{length of outline } Ot_n \text{ of T}) \quad \text{Equation 1}$$

In the example of FIG. 8, because the neighboring buildings $a_1$, $a_2$ shield the entire outlines $Ot_1$, $Ot_2$ of the target building T, respectively, the shielding ratio of each of the outlines $Ot_1$, $Ot_2$ is 100%. Further, because parts of the neighboring buildings $a_3$, $a_4$ lap over the outline $Ot_3$, as shown in FIG. 8(b), the length $l_1$ lapping over the outline of the neighboring building $a_3$ and the length $l_2$ lapping over the outline of the neighboring building $a_2$ are combined, to thereby calculate shielding ratio of the outline $Ot_3$.

A direction (side) having a shielding ratio larger than a reference value (50% or more), which is calculated based on the equation, is identified, and it is determined which of the six topology shapes the sector corresponds to. In the example of FIG. 8, because there is a road in a lower direction of the target building T and there is no neighboring building, as shown by a bold line in FIG. 8(a), it is determined that the sector has a square-cornered C topology having an open lower side.

With reference to a correction-value determination table of FIG. 9, a correction value ($r_2$) of the thus-determined topology shape is identified. The value corrected based on the quota analysis is corrected again based on the identified correction value $r_2$.

In general, the larger the open sides (directions), the relatively smaller the effects on communication characteristic of the target building and the higher the simulation accuracy. So larger correction values $r_2$ are set for square and square-cornered C, and smaller correction values $r_2$ are set for open and I. Further, different correction values are set for topology shapes having one or more open sides (other than "Open" and "square") depending on whether the nearest base station is at the open side or not (Open or Close) even if they are the same shape. Further, it is preferable to set and adjust a plurality of correction values $r_2$ for each of part or all of the topology shapes with consideration of the size (floor area or the like) of the target building T, difference in height between the neighboring building and the target building T, and the like (square-cornered C, square of FIG. 9).

Figure 10:
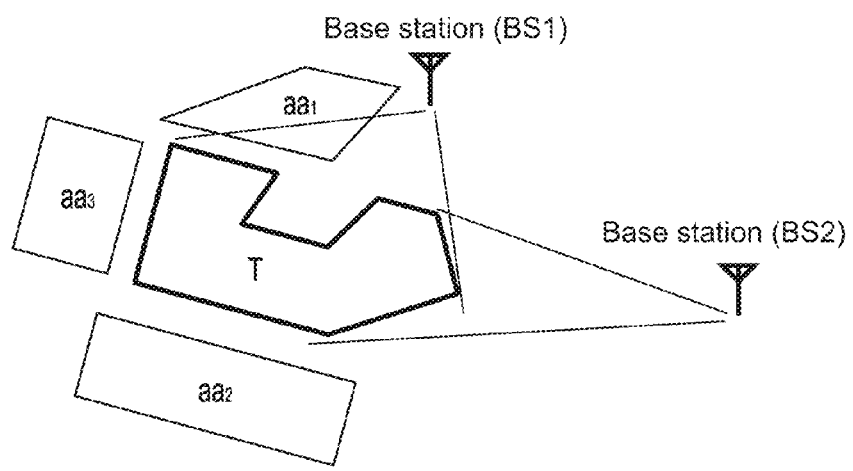
FIG. 10 is a diagram for explaining an irradiation-part shielding ratio of topology analysis.

Here, with reference to FIG. 10, a method of, in a case where there are a plurality of base stations, calculating an irradiation-part shielding ratio, and determining whether the open side of the target building T is Open or Close will be described. The example of FIG. 10 shows a square-cornered C topology shape having an open side on the right side of the sheet. In this example, a neighboring building $aa_1$ shields the target building T in the direction of the nearest base station BS1. Meanwhile, there is no neighboring building in the direction of the other base station BS2, and the direction of the other base station BS2 is open.

Because of this, in this example, it is determined that the topology shape is "square-cornered C, Open", and a correction value −(h) dB is identified.

(Geographic Feature Analysis)

Finally, a geographic feature analysis executed for a mesh having an area attribute "rural area" will be described.

According to the geographic feature analysis, in a case where there is geographical characteristic, which affects communication characteristic (electric field intensity), between the target building T and the base station BS, an A-value of the target building is locally corrected with consideration of effects of the geographical characteristic. It is an object of the geographic feature analysis to correct effects to electric field intensity caused by topography such as height of the base station, height of the target building T, and projections and depressions on the passage.

In this embodiment, as geographical patterns (characteristics) between the target building T and the base station BS, as shown in FIGS. 11(a)-(e), five types, i.e., "flat open", "high open", "depression", "foot of mountain", and "two stations", are set. As shown in FIG. 11, those geographical patterns are determined based on the fact that if conditions such as distance between the target building T and the base station B, difference in height between the target building T and the base station B, the elevation angle between the target building T and the base station B, and distance between the target building T and a geographical obstruction are satisfied. Then, A-value is corrected based on a correction value, which is set depending on the determined geographical pattern (+(a) dB for "flat open", etc.). The correction value is recorded as a communication-characteristic value of the target building T.

As a result, it is possible to execute correction process depending on a geographical pattern, and to improve analysis accuracy.

It is preferable to determine the geographical pattern by sequentially determining whether conditions of the respective geographical patterns are satisfied in the order of FIGS. 1(a)-(e). That is, first, it is determined that if the condition of "flat open" is satisfied. In a case where the condition is not satisfied, it is determined that if the condition of "high open" is satisfied. In a case where no geographical-pattern condition is satisfied, correction based on geographic feature analysis is not performed, and A-value is recorded as it is as a communication-characteristic value of the target building T.

(Configuration of Analysis System)

Figure 12:
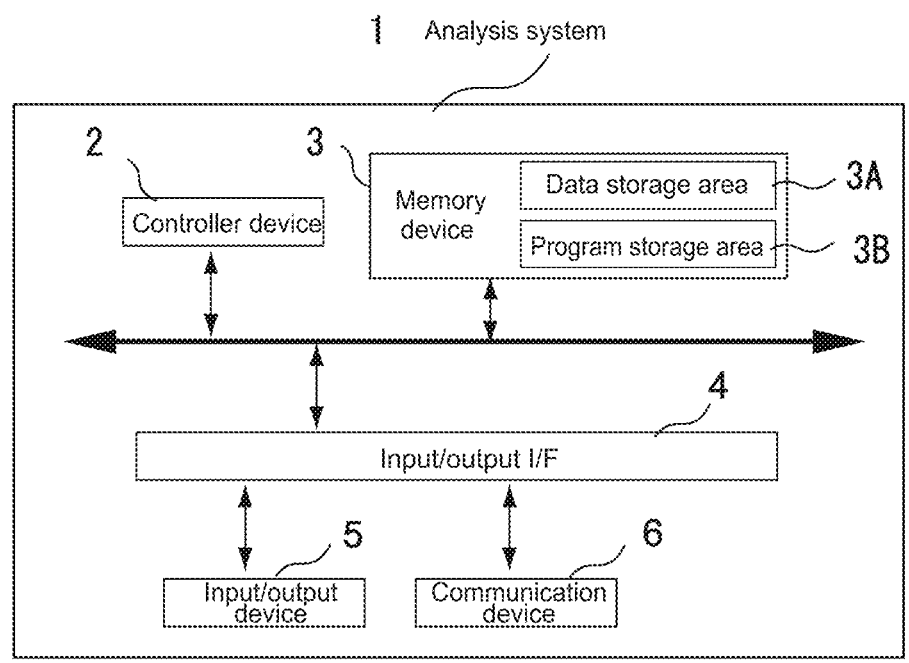
FIG. 12 is a diagram showing a hardware configuration of the communication characteristic analysis system according to the embodiment of the present invention.

Next, with reference to FIG. 12, the configuration of the analysis system of this embodiment for executing the local analyses will be described.

An analysis system 1 is a computer such as a host computer, a workstation, or a PC, and includes known hardware such as a controller device 2, a memory device 3, an input/output interface (I/F) 4, an input/output device 5, and a communication device 6. Each hardware is at least any one of, for example, a CPU (Central Processing Unit), an MPU (Micro Processing Unit), an RAM (Random Access Memory), a ROM (Read Only Memory), a DSP (Digital Signal Processor), an FPGA (Field Programmable Gate Array), an ASIC (Application Specific Integrated Circuit), an NIC (Network Interface Card), a WNIC (Wireless NIC), a modem, an optical disk, a magnetic disk, a flash memory, an LED display, a keyboard, a mouse, and the like.

The memory device 3 includes a data storage area 3A for storing the map data (see FIG. 1) and the like, and a program storage area 3B for storing a computer program executing process (described later) such as local analyses.

The data storage area 3A includes a map-data storage section 10 for storing map data, an area-attribute determination-criterion storage section 11 for storing determination criteria of the area attributes, an analysis-method storage section 12 for storing algorithm of the plurality of local-analysis methods, correction values, and the like, and a referential-estimated-value storage section 13 for storing an estimated value (A-value) for each mesh calculated by the RF simulator or the like. Each storage section is a predetermined area allocated in the memory device 3.

The analysis-method storage section 12 stores types of topology analysis, quota analysis, and geographic feature analysis in relation to area attributes, and stores detailed data necessary to the respective analysis methods and the like. In this embodiment, quota analysis and topology analysis are stored in relation to "big city", geographic feature analysis is stored in relation to "rural area", and no local-analysis method is stored in relation to "local city".

First, as information in relation to topology analysis, as shown in FIG. 7 to FIG. 9, shield-building determination criteria, criteria of a plurality of topology shapes, communication-characteristic correction values, and the like are stored (topology-shape storage section). It is preferable to set and adjust the communication-characteristic correction values based on measured values measured at a number of locations.

In order to simplify a topology shape as much as possible and to make efficient use of hardware resources, topology shapes are classified based on presence/absence of shield-buildings in N directions ($0 \leq N \leq 4$) out of the four directions of a target building, irrespective of planer shapes (outlines) of the target building and neighboring buildings. Specifically, topology shapes are classified into six types of FIG. 7 based on directions in which shield-buildings exist and based on the number of the shield-buildings.

As shield-building determination criteria, for example, as shown in FIG. 8, minimum distance from a target building, difference in height (difference in number of stories, difference in height), and a ratio of facing outlines (shielding ratio described with reference to FIG. 8) are set. Note that the parameters may include distance between neighboring buildings, distance between a neighboring building and a base station, floor area of a neighboring building, and the like.

Next, quota-analysis-related information stored in the analysis-method storage section 12 includes indexes about buildings in four sectors around the target building T being the center, and communication-characteristic correction values set based on the indexes and based on the direction of a base station, whose communication area includes the target building T (sector-communication-characteristic correction-value storage section). Here, as described above, the number of buildings in a sector, density, and the like are employed as the indexes about buildings. Each of those indexes is identified with reference to the building data in the map-data storage section 10.

Next, determination criteria of a plurality of shield geographical objects of FIG. 11, and communication-characteristic correction values for respective geographical patterns are stored for geographic feature analysis (shield-geographical-object storage section). The determination criteria of shield geographical objects are set where distance between a geographical object and a target building, difference in height, and the like are parameters.

(Configuration of Analysis Program)

Figure 13:
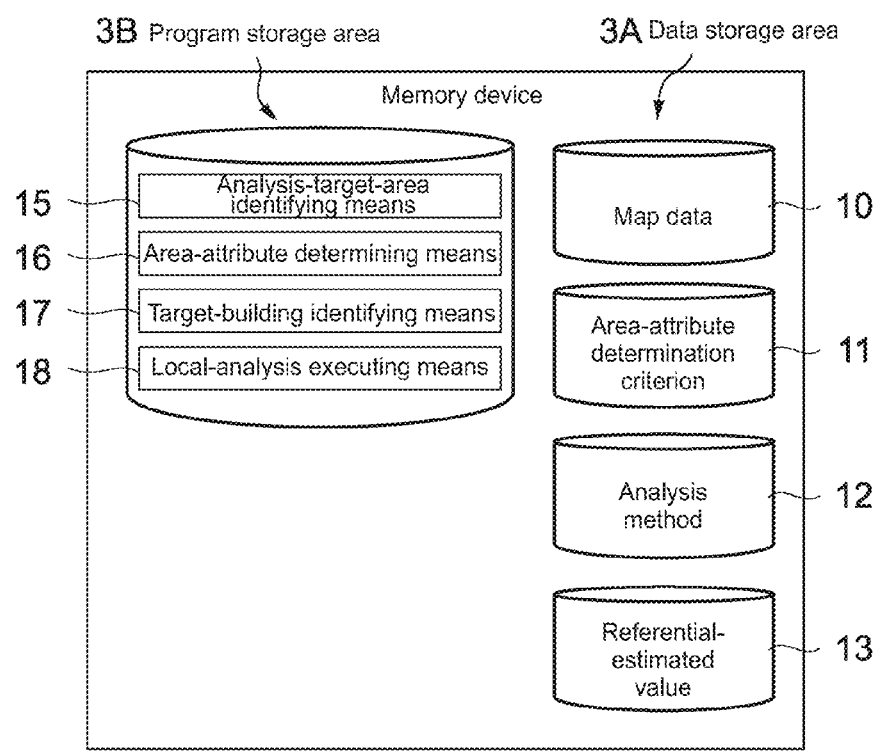
FIG. 13 is a block diagram schematically showing a software configuration and a data structure of the same.

Next, with reference to FIG. 13, an analysis program stored in the program storage area 3B of the memory device 3 will be described.

The analysis program includes an analysis-target-area identifying means 15, an area-attribute determining means 16, a target-building identifying means 17, and a local-analysis executing means 18. Each of those means is an independent program, routine, module, or the like. The controller device 2 loads each of those means in the memory device 3 onto a work area of a RAM, and executes each of those means, to thereby fulfill each function.

First, the analysis-target-area identifying means 15 identifies a location (mesh), which might be a dead area, on fundamental map data based on complaint data or improvement-apparatus data in the map-data storage section 10, and extracts an area including the mesh as an analysis-target area. The analysis-target area extracted by the analysis-target-area identifying means 15 is "NG area" of FIG. 2. Note that, irrespective of complaint data, a location whose maximum population has increased sharply because a high-rise building or a large-sized condominium building was newly built, a communication area which is covered by a base station to be replaced, or the like may be extracted as a particular location or an analysis-target area. Further, an analysis-target area may be extracted based on search information such as address, a building name, or the like input by a user.

The area-attribute determining means 16 determines an area attribute (any one of big city, local city, and rural area) of an analysis-target area extracted by the analysis-target-area identifying means 15 based on building data or population/household data in the map-data storage section 10 according to the area-attribute determination criterion.

The target-building identifying means 17 searches buildings in the analysis-target area on fundamental map data for a target building based on a search condition such as address or a building name input by a user similar to a known address search engine (software) or the like, receives a target building directly designated on map data, and identifies a target building based on building data according to search conditions such as height of a building, floor area, and distance from a base station, which are designated by a user.

The local-analysis executing means 18 searches the analysis-method storage section 12 for an analysis method in relation to the determined area attribute, locally analyzes communication characteristic of a target building, corrects the referential estimated value of an analysis-target area based on the analysis result, and outputs the corrected value as a communication-characteristic value of the target building. Further, in a case where it is determined that an area attribute of an analysis-target area is "local city", the local-analysis executing means 18 does not execute local analysis, and outputs a referential estimated value of the analysis-target area as a communication-characteristic value of the target building.

The local-analysis executing means 18 has functions common to the three local-analysis methods, and specific functions for the respective analysis methods.

First, the local-analysis executing means 18 has a building-data extracting function (means) and a base-station-data identifying function (means) as the common functions.

The building-data extracting function is a function of extracting data on location of a target building on a map and on height (number of stories, height, or the like) of the target building, extracting data on location of a building neighboring the target building and on height of the building, and extracting a planer shape (outline) of the target building and a planer shape (outline) of the neighboring building, from building data in the map-data storage section 10.

The base-station-data identifying function is a function of identifying a location of one base station or locations of two or more base stations on a map, whose communication area includes a target building, with reference to base-station data in the map-data storage section 10.

Next, specific functions for the respective analysis methods will be described.

First, the local-analysis executing means 18 has a sector dividing function, an in-sector building-data calculating function, and a sector-communication-characteristic correction-value extracting function for quota analysis.

The sector dividing function is a function of equally dividing a virtual circle having a predetermined radius and having a target building being the center into four sectors (quarter sectors), and sorting building data extracted by the building-data extracting function into the respective sectors.

The in-sector building-data calculating function is a function of calculating in-sector building data such as the number of buildings in each sector, building density, or building ratio based on building data sorted into the respective sectors by the sector dividing function.

The sector-communication-characteristic correction-value extracting function is a function of extracting a communication-characteristic correction value of a sector with reference to the in-sector building data, a location of a base station, and a sector communication-characteristic correction value (see FIG. 6) stored in the analysis-method storage section 12.

Next, the local-analysis executing means 18 has a shield-building determining function and a topology-analysis executing function for topology analysis.

The shield-building determining function is a function of calculating distance between an extracted neighboring building and a target building, and difference in height, and determining if the shield-building determination criterion is satisfied.

The topology-analysis executing function is a function of determining a topology shape around a target building based on presence/absence of a shield-building neighboring the target building, correcting a referential estimated value of an analysis-target area based on a communication-characteristic correction value of the determined topology shape, and outputting the corrected value as a communication-characteristic value of the target building.

Next, the local-analysis executing means 18 has a data extracting function, a shield-geographical-object determining function, a geographical-pattern determining function, and a communication-characteristic-value outputting function for geographic feature analysis.

The data extracting function is a function of extracting building data of a target building, extracting base-station data of a base station whose communication area includes the target building, and extracting geographical data around the target building with reference to fundamental map data, building data, and base-station data in the map-data storage section 10.

The shield-geographical-object determining function is a function of calculating a value of the geographical-object parameter based on extracted data, applying it to a shield-geographical-object determination criterion, and determining if a shield geographical object exists.

The geographical-pattern determining function is a function of determining one of the geographical patterns of FIG. 11 based on geographical data of a shield geographical object.

The communication-characteristic-value outputting function is a function of searching the memory device 3 for a communication-characteristic correction value of a determined geographical pattern, and outputting the communication-characteristic correction value as a communication-characteristic value of a target building.

(Effect of this Embodiment)

As described above, according to the analysis system (analysis method, analysis program) of this embodiment, it is possible to improve analysis accuracy of communication characteristic and to identify a local dead area while keeping a calculation amount to a minimum by using different analysis methods depending on area attributes. Specifically, in a case where both the present invention and another simulator (analysis software) are used, it is possible to identify an area or a mesh, of which accuracy of analysis result by another simulator is low, and to execute necessary correction process. So it is possible to realize analysis with a higher degree of accuracy without increasing a calculation amount.

Here, in indoor cell site design such as in a building or an underground mall, analysis accuracy tends to decrease largely, affected by outer walls of a building itself, partitions, and the like, in addition to shield objects around the building. Because of this, conventionally, a uniform inside infiltration loss (attenuation amount) value is subtracted from an RSCP calculated for a target mesh, to thereby calculate an indoor RSCP value. Then, the same indoor RSCP value is used for all the indoor locations in the mesh, and is used for an application to improve dead area or the like.

However, the indoor communication-characteristic analysis (calculation of indoor RSCP value) only statistically processes a small amount of measured values, map data, indoor room-layout data, and the like, and is not capable of extracting a local dead area with a high degree of accuracy.

By using the analysis system of the embodiment, analysis may be performed efficiently, and accuracy may be improved in the indoor communication-characteristic analysis. Specifically, the higher the frequency band of a radio communication network in order to realize high-speed communication, the less the occurrence of diffraction of radio waves. As a result, an indoor communication environment tends to be further made worse. So, if a telecommunication company locally analyzes indoor communication characteristic of various kinds of buildings such as schools, high-rise buildings, users' homes, and small-sized stores by using the analysis system of this embodiment, the telecommunication company is capable of obtaining an appropriate solution promptly and effectively.

<Second Embodiment>

Next, with reference to FIG. 14, a second embodiment of the present invention will be described.

This embodiment is characterized by calculating an indoor communication-characteristic value for each building, and selecting, as an analysis-target area, a mesh including a predetermined number or more of buildings each having an indoor communication-characteristic value less than the reference value. Note that structural elements common to the first embodiment and the corresponding structural elements will not be shown in the drawings and will not be described.

Figure 14:
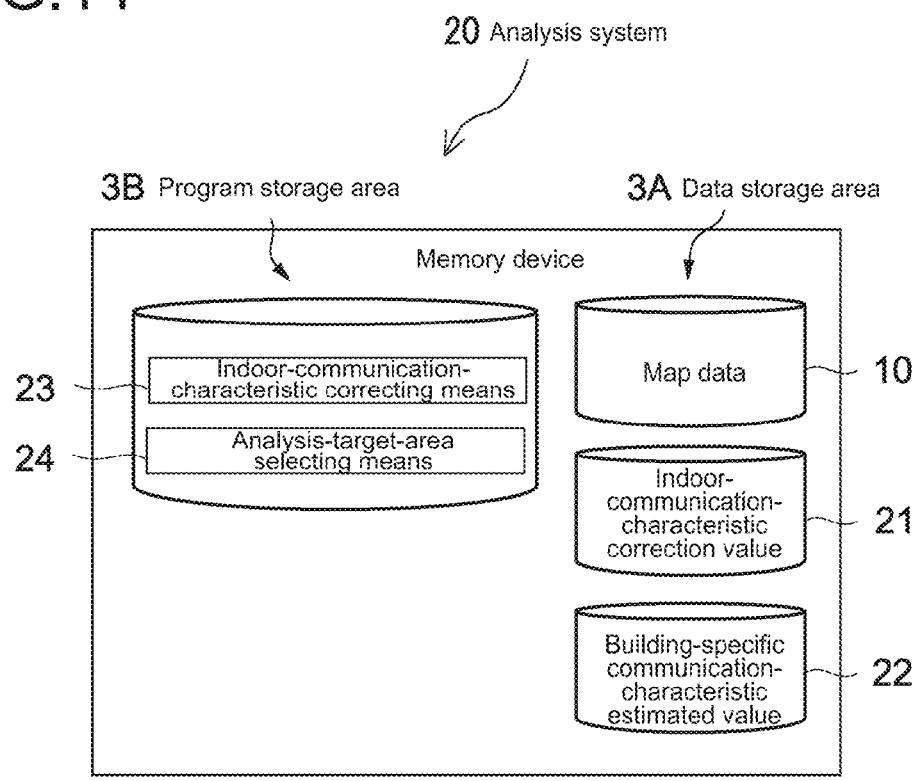
FIG. 14 is a block diagram schematically showing a configuration of an analysis system according to a second embodiment of the present invention.

Specifically, as shown in FIG. 14, an analysis system 20 of this embodiment includes an indoor-communication-characteristic correction-value storage section 21, a building-specific communication-characteristic estimated-value storage section 22, an indoor-communication-characteristic correcting means 23, and an analysis-target-area selecting means 24.

The indoor-communication-characteristic correction-value storage section 21 stores indoor-communication-characteristic correction values, which are set depending on size or a types of buildings (hereinafter, collectively referred to as "building type"). The indoor-communication-characteristic correction values are, for example, set as follows with consideration of indoor infiltration losses of radio waves depending on materials of outer walls and inner walls, thickness, building frame structures, height, and the like.

Large-sized building having floor area of S1 m$^2$ or more: −A1 dB

Middle-sized building having floor area of S2 m$^2$ or more and less than S1 nm: −A2 dB Small-sized building having floor area of S3 m$^2$ or more and less than S2 mm: −A3 dB Detached house, irrespective of floor area: −A4 dB The building-specific communication-characteristic estimated-value storage section 22 stores estimated values of communication characteristic of buildings on map data (hereinafter, "building-specific communication-characteristic estimated-values"), which are calculated based on a method different from the analysis methods stored in the analysis-method storage section 12 by an existing RF simulator or the like, in relation to respective buildings. The building-specific communication-characteristic estimated-value storage section 22 may embed the building-specific communication-characteristic estimated-values in a layer of map data of FIG. 1.

The indoor-communication-characteristic correcting means 23 determines the building type for each building with reference to building data in the map-data storage section 10, and corrects a building-specific communication-characteristic estimated-value of the building based on an indoor-communication-characteristic correction value depending on a building type. For example, in a case where an indoor communication-characteristic value of a particular large-sized building obtained by an RF simulator is −A dBm, because an indoor-communication-characteristic correction value is −B dB, the indoor communication-characteristic value of the building is −(A+B) dBm.

The analysis-target-area selecting means 24 selects an area including a predetermined number or more (for example, N or more) of buildings having corrected building-specific communication-characteristic estimated-values equal to or less than a predetermined reference value (for example, −A dBm or less) as an analysis-target area. The area selecting process may be executed for each mesh, for each administrative district, for each arbitrary area including a particular location being the center, or for each arbitrary area including a particular location. As described above, an area attribute is determined, topology analysis is executed, and the like with respect to the thus selected area.

(Verification Based on Measured Value)

Next, with reference to FIG. 15 to FIG. 20, verification results of results of the local analyses executed by the analysis system of the embodiment based on measured values will be described.

First, FIG. 15(A) is a graph showing comparison between analysis values (A-values) obtained by an existing RF simulator and on-site measured values, and showing a consistency rate. FIG. 15(B) is a graph showing comparison between results of A-values corrected based on the local analyses of the present system and measured values, and showing a consistency rate. Each of those graphs is a difference distribution graph in which difference of radio-wave received strength of measured values and radio-wave received strength of analysis values (−35 dB to +45 dB) are plotted on the horizontal axis, and the number of corresponding locations are plotted on the vertical axis, and does not show levels (received strength, connection, and the like) of communication environments (characteristic) of respective locations. For example, locations, whose differences with measured values are the same, include both "locations having trouble getting connection" and "locations easy to get connection".

Here, "consistency rate" means a ratio of measurement locations, of which difference between an analysis value (A-value and local-analysis-corrected value) and a measured value of communication characteristic is plus/minus X db or less with consideration of a measurement error, to all the measurement locations. Further, a measured value is an outdoor measured value, in principle. In a case where a value is not measured outdoors, the most preferable value out of indoor measured values is replaced for outdoor electric field intensity. Other basic data of the measured value and A-value is as follows.

Measurement date: December 2007

Measurement unit: 100 m mesh

Measurement locations: 18,855 locations

Locations determined to have preferable communication characteristic based on A-value: 15,887 locations Of those, locations determined not to have preferable communication characteristic based on measured value: 200 locations (consistency rate 98.7%)

Locations determined not to have preferable communication characteristic (NG) based on A-value: 2,968 locations FIG. 15 show verified results about 2,968 locations determined NG based on the A-value.

As shown in FIG. 15(A), consistency rate between A-values before correction process and measured values was 61.91% (about 1,840 locations). By correcting the A-values based on the local analyses, the consistency rate was improved and reached 72.92% (about 2,160 locations).

Further, out of locations at which A-values are different from measured values, as shown in FIG. 15(A), the ratio of locations at which A-values are better than measured values (left side in graph) is 3.48% (about 100 locations), and the ratio of locations at which measured values are better than A-values (right side in graph) is 34.62% (about 1,030 locations). In addition, the peak of the distribution is +4 dB. In view of the above, it is understood that a harsh evaluation is presented. Further, it is impossible to find out a clear dividing line between a consistency-rate range and an inconsistent range. In view of this, in order to improve consistency rate, it is necessary to extract inconsistent points, to verify a particular cause, and to set a correction value or to correct a constant, a coefficient, or the like.

To the contrary, in FIG. 15(B), the ratio of locations at which analysis values after local correction process are better than measured values (left side in graph) is 11.17% (about 330 locations), and the ratio of locations at which measured values are better than analysis values (right side in graph) is 15.90% (about 470 locations). Further, the peaks of the distribution are in the vicinity of plus/minus 3 dB, and the dividing line between the consistency-rate range and the inconsistent range is clear. Therefore, by adjusting an analysis parameter or a correction value of local analysis, the consistency rate is further improved easily.

Next, with reference to each of FIG. 16 to FIG. 20, an example in which each of uncorrected A-values and locally-corrected correction values are compared to measured values will be described for each of a plurality of patterns of the local analyses. The vertical axis and the horizontal axis of each graph are similar to those of FIG. 15 described above.

First, FIG. 16 show comparison results before/after execution of local analyses (quota analysis and topology analysis) for a mesh in a big city. In FIG. 16(A), the consistency rate between A-values before local correction and measured values was 65.65%. By correcting the A-values based on quota analysis, the consistency rate was improved and reached 68.70% (FIG. 16(B)). Further, by correcting the corrected values based on topology analysis, the consistency rate was improved and reached 80.36%.

Next, FIG. 17 show comparison results of before/after correction of an "open" topology and an "I" topology based on topology analysis. In each type, the consistency rate is improved by 10% or more. Further, FIG. 18 shows comparison results of topology analysis with respect to the other types. With reference to the table, the consistency rate is improved by 3% to 19% after correction based on the local analysis.

FIG. 19 show comparison results of before/after correction of quota analysis for each of four sector types. In each type, the consistency rate is improved greatly, i.e., by about 30% to 60%.

Finally, FIG. 20 show comparison results of before/after correction of geographic feature analysis for each of five geographical types. In each type, the consistency rate is improved greatly, i.e., by about 30% to 65%.

MODIFIED EXAMPLES

The present invention is not limited to the above-mentioned embodiments, and may be variously modified within the scope of the gist of the present invention.

For example, in the embodiments, a case where the analysis system of the present invention locally corrects a communication-characteristic value (A-value) calculated by an existing RF simulator is described. The analysis system of the present invention may be used as an independent analysis software as in the case of an existing RF simulator, or may be mounted as an add-in of an existing RF simulator. In a case where the analysis system of the present invention is used as independent analysis software, the analysis system executes the analysis process with respect to a plurality of targets in an analysis-target area (one mesh or plurality of meshes), and statistically processes a plurality of analysis results, to thereby calculate communication characteristic of the area. Alternatively, without using a simulator, communication-characteristic values corresponding to a plurality of area attributes may be previously set for each mesh, and the system of the present invention may correct the communication-characteristic values. In this case, it is preferable to segmentalize area attributes, and to set more than three area attributes.

Further, the first embodiment and the second embodiment may be executed in combination or may be selectively executed. That is, both complaint data and building-specific communication-characteristic estimated-values are referred to when an analysis-target area is selected (identified), and local analysis is executed with respect to an area extracted based on any condition. Alternatively, local analysis is executed with respect to an area satisfying both the conditions at the first priority, and local analysis is executed as necessary with respect to an area satisfying any one of the conditions or local analysis is not executed with respect thereto. Further, a determination criterion of an area attribute, a correction value of local analysis, the kind of topology shape, a determination criterion, or the like may be changed depending on a selection condition.

Further, the kinds of local-analysis methods, classification of area attributes, an analysis method for each area attribute, the kind and condition of topology shape, the kind and condition of a geographical pattern of geographic feature analysis, respective correction values, and the like are not limited to the above.

Further, in the embodiments, the local analysis system includes the map-data storage section. Alternatively, for example, the local analysis system may access a map-data provider server in a network, and may obtain map data as necessary. In this case, the map-data provider server may be installed by a user, may be a rental server, or may be an external commercial service.

DESCRIPTION OF REFERENCE NUMERALS 1, 20 analysis system
2 controller device
3 memory device
4 input/output interface
5 input/output device
6 communication device
10 map-data storage section
11 area-attribute determination-criterion storage section
12 analysis-method storage section
13 referential-estimated-value storage section
15 analysis-target-area identifying means
16 area-attribute determining means
17 target-building identifying means
18 local-analysis executing means
21 indoor-communication-characteristic correction-value storage section
22 building-specific communication-characteristic estimated-value storage section
23 indoor-communication-characteristic correcting means
24 analysis-target-area selecting means

The invention claimed is:

1. A communication characteristic analysis system, comprising:
   an area-attribute determination-criterion storage section storing a determination criterion, the determination criterion being used to determine two or more area attributes, the area attribute being of a predetermined area on a map, the area attribute being classified based on object data or statistical data of the area;
   an analysis-method storage section storing a plurality of local-analysis methods of communication characteristic in relation to the area attributes, respectively;
   a referential-estimated-value storage section storing an estimated value of communication characteristic (hereinafter, "referential estimated value") in relation to the area, the referential estimated value being calculated for each predetermined area on the map based on a method different from a plurality of local-analysis methods stored in the analysis-method storage section;
   an area-attribute determining means for determining an area attribute of an analysis-target area selected from the area based on object data or statistical data of the area according to the area-attribute determination criterion;
   a target-building identifying means for receiving a designated building being a target of local analysis (hereinafter, "target building") out of buildings in the analysis-target area; and
   a local-analysis means for selecting a local-analysis method from the analysis-method storage section based on a determined area attribute, for locally analyzing a communication characteristic of a target building based on the selected local-analysis method, for correcting the referential estimated value of an analysis-target area based on the analysis result, and for outputting the corrected value as a communication-characteristic value of a target building.

2. The communication characteristic analysis system according to claim 1, wherein
   the analysis-method storage section stores topology analysis, quota analysis, or geographic feature analysis as the local-analysis method in relation to the area attribute.

3. The communication characteristic analysis system according to claim 1, further comprising
   a map-data storage section storing map data including fundamental map data, population/household data, and building data, wherein
   the area-attribute determination-criterion storage section stores a determination criterion, the determination criterion being used to determine two or more area attributes, the area attribute being classified based on object data or statistical data of one of population, households, and buildings in an area, and
   the area-attribute determining means determines an area attribute of an analysis-target area based on population/household data and building data in the map-data storage section according to the area-attribute determination criterion.

4. The communication characteristic analysis system according to claim 3, wherein
   the map-data storage section stores building data and/or population/household data for each area, the area being obtained by dividing fundamental map data by a predetermined range, and
   the area-attribute determination-criterion storage section stores a determination criterion, the determination criterion being based on object data or statistical data of one of daytime population, night-time population, daytime/night-time maximum population, population density, building density, average height of buildings, and maximum height of buildings, the determination criterion being used to determine area attributes of "big city", "local city", and "rural area".

5. The communication characteristic analysis system according to claim 4, wherein
   the analysis-method storage section stores quota analysis and topology analysis in relation to an area attribute "big city", stores geographic feature analysis in relation to an area attribute "rural area", and stores no analysis method in relation to an area attribute "local city", and the local-analysis means outputs, in a case where it is determined that an area attribute of an analysis-target area is "local city", a referential estimated value of the analysis-target area as a communication-characteristic value of the target building.

6. The communication characteristic analysis system according to claim 3, wherein
the analysis-method storage section stores a plurality of analysis methods including topology analysis as local-analysis methods,
the analysis-method storage section includes a topology-shape storage section, the topology-shape storage section storing a shield-building determination criterion, a topology-shape determination criterion, and communication-characteristic correction values, the shield-building determination criterion being used to determine if a building neighboring an arbitrary target building (neighboring building) can be a shield-building shielding a radio wave from a base station in relation to distance and/or difference in height between the neighboring building and the target building, the topology-shape determination criterion being of a plurality of topology shapes, the topology shape being obtained by simplifying outlines of one or more shield-buildings, the communication-characteristic correction value being set for each topology shape, and
the local-analysis means determines a topology shape around a target building with reference to the map-data storage section and the topology-shape storage section, corrects a referential estimated value of an analysis-target area based on a communication-characteristic correction value of the topology shape, and outputs the corrected value as a communication-characteristic value of a target building.

7. The communication characteristic analysis system according to claim 6, wherein
the local-analysis means includes
a building-data extracting means for extracting data on a location and height of a target building and data on a location and height of a building neighboring the target building from building data in the map-data storage section,
a shield-building determining means for calculating distance and/or difference in height between an extracted neighboring building and a target building, and for determining if the shield-building determination criterion is satisfied, and
a topology-analysis executing means for determining a topology shape around a target building based on presence/absence of a shield-building neighboring a target building, for correcting a referential estimated value of an analysis-target area based on a communication-characteristic correction value of a determined topology shape, and for outputting the corrected value as a communication-characteristic value of a target building.

8. The communication characteristic analysis system according to claim 7, wherein
the topology-shape storage section stores a determination criterion of a plurality of topology shapes, the plurality of topology shapes being classified based on presence/absence of a shield-building in N directions (0≤N≤4) out of four directions of a target building, and
the topology-analysis executing means identifies N directions in which a shield-building exists with reference to location data of a building determined to be a shield-building and of a target building, and determines a topology shape.

9. The communication characteristic analysis system according to claim 7, wherein
the topology-shape storage section stores, as a shield-building determination criterion, a reference value of ratio (shielding ratio) of an outline in an arbitrary direction of a target building and length of a segment of the outline facing an outline of a neighboring building,
the building-data extracting means extracts a planer shape (outline) of a target building and a planer shape (outline) of a neighboring building from building data in the map-data storage section, and
the topology-analysis executing means calculates shielding ratio in each direction of a target building based on an extracted outline of a target building and based on an extracted outline of a neighboring building, decides that a shield-building exists in a direction in which the shielding ratio is larger than the reference value, and determines a topology shape.

10. The communication characteristic analysis system according to claim 7, wherein
the map-data storage section stores base-station data including location of a base station,
the topology-shape storage section stores, with respect to topology shapes in each of which at least one direction seen in a plan view is open, a communication-characteristic correction value for a case where a shield-building shields a base-station direction, and a communication-characteristic correction value for a case where a base-station direction is open, the communication-characteristic correction values being different from each other, and
the topology-analysis executing means decides if a base-station direction of a determined topology shape is shielded or open with reference to base-station data, and extracts a communication-characteristic correction value from the topology-shape storage section.

11. The communication characteristic analysis system according to claim 3, wherein
the analysis-method storage section stores a plurality of analysis methods including quota analysis as local-analysis methods,
the analysis-method storage section includes a sector-communication-characteristic correction-value storage section, the sector-communication-characteristic correction-value storage section storing a communication-characteristic correction value, the communication-characteristic correction value being set based on the number of buildings in a sector, the number of buildings to area of a sector (density), or ratio of total floor area of buildings to area of a sector (building ratio), and based on a direction of a base station whose communication area includes an arbitrary building, the sector being obtained by equally dividing a virtual circle having a predetermined radius and having the arbitrary building being the center into four portions,
the map-data storage section stores base-station data including location of a base station, and
the local-analysis means extracts a communication-characteristic correction value of a sector with reference to the map-data storage section and the sector-communication-characteristic correction-value storage section, corrects a referential estimated value of an analysis-target area based on the sector communication-characteristic correction value, and outputs the corrected value as a communication-characteristic value of a target building.

12. The communication characteristic analysis system according to claim 11,
the local-analysis means further includes
a building-data extracting means for equally dividing a virtual circle having a target building being the center into four sectors, and for extracting building data in each sector with reference to fundamental map data and building data in the map-data storage section,
an in-sector building-data calculating means for calculating the number of buildings in a sector, building density, or building ratio (hereinafter, collectively referred to as "in-sector building data") based on extracted building data,
a base-station-data identifying means for identifying location of a base station whose communication area includes a target building with reference to base-station data in the map-data storage section, and
a sector-communication-characteristic correction-value extracting means for extracting a communication-characteristic correction value of the sector with reference to the in-sector building data, location of a base station, and the sector-communication-characteristic correction-value storage section.

13. The communication characteristic analysis system according to claim 3, wherein
the analysis-method storage section stores a plurality of analysis methods including geographic feature analysis as local-analysis methods,
the analysis-method storage section includes a shield-geographical-object storage section, the shield-geographical-object storage section storing a shield-geographical-object determination criterion and a communication-characteristic correction value, the shield-geographical-object determination criterion being a criterion used to determine if a geographical object around an arbitrary target building can be a shield geographical object shielding a radio wave from a base station whose communication area includes a target building, the shield-geographical-object determination criterion including at least one of distance between a geographical object and a target building, difference in height between a geographical object and a target building, an elevation angle between a geographical object and a target building, distance between a geographical object and a base station, difference in height between a geographical object and a base station, and an elevation angle between a geographical object and a base station as a parameter (hereinafter, "geographical-object parameter"), the communication-characteristic correction value being set for each of a plurality of geographical patterns classified depending on geographical data such as shape, size, and height of a shield geographical object,
the map-data storage section stores base-station data including location of a base station, and
the local-analysis means determines a geographical pattern of a geographical object around a target building with reference to the map-data storage section and the shield-geographical-object storage section, corrects a referential estimated value of an analysis-target area based on a communication-characteristic correction value of the geographical pattern, and outputs the corrected value as a communication-characteristic value of a target building.

14. The communication characteristic analysis system according to claim 13,
the local-analysis means further includes
a data extracting means for extracting building data of a target building, base-station data of a base station whose communication area includes a target building, and geographical data around a target building with reference to fundamental map data, building data, and base-station data in the map-data storage section,
a shield-geographical-object determining means for calculating a value of the geographical-object parameter based on extracted data, for applying the calculated value to a shield-geographical-object determination criterion, and for determining if a shield geographical object exists,
a geographical-pattern determining means for determining a geographical pattern based on geographical data of a shield geographical object, and
a communication-characteristic-value outputting means for searching the shield-geographical-object storage section for a communication-characteristic correction value of a determined geographical pattern, and for outputting the communication-characteristic correction value as a communication-characteristic value of a target building.

15. The communication characteristic analysis system according to claim 3, wherein
the map-data storage section stores complaint data or improvement-apparatus data, the complaint data being data identifying location relating to a complaint, the complaint being about a communication environment obtained from a user of wireless communication service, the improvement-apparatus data being data identifying location at which a communication apparatus for locally improving a communication environment is installed,
the system further comprises an analysis-target-area identifying means for identifying particular location on fundamental map data based on complaint data or improvement-apparatus data in the map-data storage section, and for extracting an area including the particular location as an analysis-target area,
the area-attribute determining means determines an area attribute of an extracted analysis-target area.

16. The communication characteristic analysis system according to claim 3, further comprising:
an indoor-communication-characteristic correction-value storage section storing a correction value of indoor communication characteristic, the correction value being set depending on size or a type of a building (hereinafter, collectively referred to as "building type");
a building-specific communication-characteristic estimated-value storage section storing an estimated value of communication characteristic of a building on map data (hereinafter, "building-specific communication-characteristic estimated-value") in relation to each building, the building-specific communication-characteristic estimated-value being calculated based on a method different from analysis methods stored in the analysis-method storage section;
an indoor-communication-characteristic correcting means for determining a building type of a building with reference to building data in the map-data storage section, and for correcting a building-specific communication-characteristic estimated-value of the building based on an indoor-communication-characteristic correction value corresponding to the building type; and an analysis-target-area selecting means for selecting, as the analysis-target area, an area including a predetermined number or more of buildings each having a corrected building-specific communication-characteristic estimated-value equal to or less than a predetermined reference value.

17. A communication characteristic analysis system, comprising:
an area-attribute determination-criterion storage section storing a determination criterion, the determination criterion being used to determine two or more area attributes, the area attribute being of a predetermined area on a map, the area attribute being classified based on object data or statistical data of the area;
an analysis-method storage section storing a plurality of local-analysis methods of communication characteristic in relation to the area attributes, respectively, the plurality of local-analysis methods including topology analysis, quota analysis, and geographic feature analysis;
an area-attribute determining means for determining an area attribute of a selected analysis-target area based on object data or statistical data of the area according to the area-attribute determination criterion; and
a local-analysis means for selecting a local-analysis method from the analysis-method storage section based on a determined area attribute, and for locally analyzing a communication characteristic of an analysis-target area based on the selected local-analysis method.

18. A communication characteristic analysis method executed by a computer storing, in a storage device,
a determination criterion, the determination criterion being used to determine two or more area attributes, the area attribute being of a predetermined area on a map, the area attribute being classified based on object data or statistical data of the area,
a plurality of local-analysis methods of communication characteristic in relation to the area attributes, respectively, and
an estimated value of communication characteristic (hereinafter, "referential estimated value"), the referential estimated value being calculated for each predetermined area on the map based on a method different from the local-analysis methods,
the communication characteristic analysis method comprising:
an area-attribute determining step of determining an area attribute of an analysis-target area selected from the area based on object data or statistical data of the area according to the area-attribute determination criterion;
a target-building identifying step of receiving a designated building being a target of local analysis (hereinafter, "target building") out of buildings in the analysis-target area; and
a local-analysis step of selecting a local-analysis method from the analysis-method storage section based on a determined area attribute, of locally analyzing a communication characteristic of a target building based on the selected local-analysis method, of correcting the referential estimated value of an analysis-target area based on the analysis result, and of outputting the corrected value as a communication-characteristic value of a target building.

* * * * *